United States Patent
Li et al.

(10) Patent No.: US 11,570,065 B2
(45) Date of Patent: Jan. 31, 2023

(54) SERVICE ENABLER FUNCTION

(71) Applicant: CONVIDA WIRELESS, LLC, Wilmington, DE (US)

(72) Inventors: Hongkun Li, Malvern, PA (US); Guang Lu, Ontario (CA); Lijun Dong, San Diego, CA (US); Dale N. Seed, Allentown, PA (US); William Robert Flynn, IV, Schwenksville, PA (US); Catalina M. Mladin, Hatboro, PA (US); Xu Li, Plainsboro, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 685 days.

(21) Appl. No.: 15/302,545

(22) PCT Filed: Apr. 9, 2015

(86) PCT No.: PCT/US2015/025077
§ 371 (c)(1),
(2) Date: Oct. 7, 2016

(87) PCT Pub. No.: WO2015/157502
PCT Pub. Date: Oct. 15, 2015

(65) Prior Publication Data
US 2017/0034015 A1    Feb. 2, 2017

Related U.S. Application Data

(60) Provisional application No. 61/977,382, filed on Apr. 9, 2014.

(51) Int. Cl.
*G06F 15/177* (2006.01)
*H04L 41/50* (2022.01)
(Continued)

(52) U.S. Cl.
CPC ............ *H04L 41/5045* (2013.01); *G06F 8/61* (2013.01); *G06F 9/44505* (2013.01); *H04L 41/5058* (2013.01); *H04W 4/50* (2018.02)

(58) Field of Classification Search
CPC ........... H04M 1/72522; H04M 3/2209; H04M 12/08; H04M 15/49; H04W 4/70;
(Continued)

(56) References Cited

U.S. PATENT DOCUMENTS

| 6,880,158 | B1 * | 4/2005 | Basso | ................ G06F 9/45537 719/321 |
| 7,356,615 | B2 * | 4/2008 | Cai | ..................... H04L 67/2823 709/223 |

(Continued)

FOREIGN PATENT DOCUMENTS

| CN | 102067519 A | 5/2011 |
| CN | 104980525 A | 10/2015 |

(Continued)

OTHER PUBLICATIONS

English Translation of JP Office Action dated Jan. 23, 2018 for JP Application No. 2016561638.
(Continued)

*Primary Examiner* — Dustin Nguyen
(74) *Attorney, Agent, or Firm* — BakerHostetler

(57) ABSTRACT

The present application describes a method and apparatus for updating a service in a service layer function of a network. In particular, a method for adding a service is disclosed. Initially, a request is received at a service enabler function located in the service layer function to add the service. A service description of the requested service is reviewed to understand its capabilities. A verification request is sent to a service capability located in the service
(Continued)

500 layer function. Further, another service layer function or application is notified that the requested service is enabled.

18 Claims, 21 Drawing Sheets

(51) Int. Cl.
  *H04L 41/5041*  (2022.01)
  *G06F 8/61*  (2018.01)
  *G06F 9/445*  (2018.01)
  *H04W 4/50*  (2018.01)

(58) Field of Classification Search
  CPC ..... H04W 36/08; H04W 12/069; H04W 4/50;
    H04W 60/00; H04W 76/14; H04W 88/16;
    G06F 8/10; G06F 8/36; G06F 9/00; G06F
    9/541; G06F 8/30; G06F 8/20; G06F
    9/45537; H04L 29/06; H04L 41/0843;
    H04L 41/5077; H04L 67/16; H04L
    41/5058; H04L 67/32; H04L 67/2823;
    H04L 67/12; H04L 67/26; H04L 65/60;
    H04N 7/17318
  See application file for complete search history.

(56) References Cited

U.S. PATENT DOCUMENTS

| | | | | |
|---|---|---|---|---|
| 8,387,039 | B2* | 2/2013 | Goring | G06F 8/20 |
| | | | | 717/177 |
| 9,439,026 | B2* | 9/2016 | Pareglio | H04W 60/00 |
| 9,491,673 | B2* | 11/2016 | Jain | H04W 36/08 |
| 9,882,829 | B2* | 1/2018 | Maes | H04L 67/16 |
| 10,177,996 | B2* | 1/2019 | Williams | H04L 41/5077 |
| 2005/0091219 | A1 | 4/2005 | Karachale et al. | |
| 2006/0159077 | A1* | 7/2006 | Vanecek | G06F 8/30 |
| | | | | 370/360 |
| 2007/0294405 | A1* | 12/2007 | Mohindra | H04L 67/16 |
| | | | | 709/226 |
| 2007/0294668 | A1 | 12/2007 | Mohindra et al. | |
| 2008/0086564 | A1* | 4/2008 | Putman | H04L 29/06 |
| | | | | 709/227 |
| 2008/0141137 | A1* | 6/2008 | Cleary | H04N 7/17318 |
| | | | | 715/733 |
| 2008/0209397 | A1* | 8/2008 | Mohindra | G06F 8/36 |
| | | | | 717/120 |
| 2010/0235430 | A1* | 9/2010 | Kim | H04M 1/72522 |
| | | | | 709/203 |
| 2011/0320605 | A1* | 12/2011 | Kramer | H04L 41/0843 |
| | | | | 709/226 |
| 2012/0047551 | A1* | 2/2012 | Pattar | H04W 4/70 |
| | | | | 726/1 |
| 2012/0233589 | A1* | 9/2012 | Mruthyunjaya | G06F 8/10 |
| | | | | 717/105 |
| 2012/0254899 | A1* | 10/2012 | Sharma | G06F 9/541 |
| | | | | 719/328 |
| 2012/0266223 | A1* | 10/2012 | Yegin | H04W 4/50 |
| | | | | 726/7 |
| 2013/0007242 | A1* | 1/2013 | Wang | G06F 9/00 |
| | | | | 709/223 |
| 2013/0041997 | A1* | 2/2013 | Li | H04L 67/12 |
| | | | | 709/223 |
| 2013/0176907 | A1* | 7/2013 | Foti | H04M 15/49 |
| | | | | 370/259 |
| 2013/0188515 | A1 | 7/2013 | Pinheiro et al. | |
| 2013/0272252 | A1* | 10/2013 | Jain | H04L 65/60 |
| | | | | 370/329 |
| 2014/0052775 | A1* | 2/2014 | Koo | H04W 76/14 |
| | | | | 709/203 |
| 2014/0074973 | A1* | 3/2014 | Kumar | H04L 67/32 |
| | | | | 709/217 |
| 2014/0075019 | A1* | 3/2014 | Mordani | H04L 41/5058 |
| | | | | 709/224 |
| 2014/0086177 | A1* | 3/2014 | Adjakple | H04W 12/08 |
| | | | | 370/329 |
| 2014/0126581 | A1 | 5/2014 | Wang et al. | |
| 2014/0242940 | A1* | 8/2014 | Koo | H04W 4/70 |
| | | | | 455/406 |
| 2014/0351403 | A1* | 11/2014 | Lin | H04L 67/16 |
| | | | | 709/223 |
| 2015/0143472 | A1* | 5/2015 | Kim | H04W 12/069 |
| | | | | 726/4 |
| 2015/0282221 | A1* | 10/2015 | Foti | H04W 88/16 |
| | | | | 455/517 |
| 2015/0373127 | A1* | 12/2015 | Ly | H04W 4/70 |
| | | | | 709/217 |
| 2016/0192111 | A1* | 6/2016 | Choi | H04L 67/26 |
| | | | | 455/507 |
| 2016/0205494 | A1* | 7/2016 | Sun | H04W 4/70 |
| | | | | 709/226 |
| 2016/0227045 | A1* | 8/2016 | Hunt | H04M 3/2209 |
| 2017/0034015 | A1 | 2/2017 | Li et al. | |

FOREIGN PATENT DOCUMENTS

| | | |
|---|---|---|
| JP | 2009-540469 A | 11/2009 |
| JP | 2012-069113 A | 4/2012 |
| JP | 2013-522965 A | 6/2013 |
| JP | 2014-506764 A | 3/2014 |
| JP | 2017-524168 | 8/2017 |
| KR | 10-2008-0098434 A | 11/2008 |
| KR | 10-0920850 | 10/2009 |
| KR | 10-2011-0031201 A | 3/2011 |
| KR | 10-1114181 B1 | 2/2014 |
| WO | WO 2007-146368 A2 | 12/2007 |
| WO | 2012/118711 A2 | 9/2012 |
| WO | 2014/037054 A1 | 3/2014 |

OTHER PUBLICATIONS

Korean Patent Application No. 10-2016-7025843: Notice Of Preliminary Rejection dated Sep. 11, 2017, 6 pages.
Boswarthick et al, "M2M Communicatons: A Systems Approach: ProQuest Tech Books", John Wiley & Sons, Mar. 1, 2012, 12 pages.
Broadband Forum Technical Report, "TR-069 Amendment 3 CPE WAN Management Protocol", Issue: 1, Protocol Version: 1.2, Nov. 2010, 197 pages.
Cheshire, S. and Krochmal, M., "DNS-Based Service Discovery", Internet Engineering Task Force (IETF), RFC 6763, Feb. 2013, 49 pages.
European Telecommunications Standards Institute (ETSI) TS 102 690 V1.1.1, Machine-to-Machine Communications (M2M); Functional Architecture, Technical Specification, Oct. 2011, 280 pages.
International Patent Application No. PCT/US2015/025077: International Search Report and The Written Opinion dated Jul. 17, 2015, 12 pages.
One M2M "Service Component Architecture", TS-0007 V0.1.0, Technical Specification, Feb. 22, 2014, 17 pages.
OneM2M "Functional Architecture Baseline Draft", TS-0001 V-0.4.2, Mar. 4, 2014, 303 pages.
Open Connectivity Foundation (OCF) "OCF Solving The IOT Standards Gap", ©2017, 7 pages.
Open Mobile Alliance (OMA) "Lightweight Machine to Machine Technical Specification" Candidate Version 1.0, Dec. 10, 2013, 104 pages.
Open Mobile Alliance (OMA) "OMA Device Management Notification Initiated Session" Approved version 1.2.1, Jun. 17, 2008, 16 pages.
W3C "Web Services Description Language (WSDL) 1.1", W3C Note, Mar. 15, 2001, 53 pages.
www.osgi.org "The Dynamic Module System for Java", OSGI Alliance, © 2017, 2 pages.

* cited by examiner

SERVICE ENABLER FUNCTION

RELATED APPLICATIONS

This application is a National Stage Application filed under 35 U.S.C. 371 of International Application No. PCT/US2015/025077, filed Apr. 9, 2015, which claims priority to U.S. Provisional Application No. 61/977,382, filed Apr. 9, 2014, titled "Service Enabler Function" the contents of which are incorporated in their entireties herein.

FIELD OF THE APPLICATION

The present application relates to apparatuses and methods for improving services in a service layer without impacting the operability of the system. More particularly, the application relates to improving services on middleware service layers employing a service enabler function.

BACKGROUND

In more recent times, users have become accustomed to receiving static services from their service providers. Static services occur when a service platform is re-synchronized with updated capabilities and features when new services are added to the system. Namely, the service platform needs to re-organize its resources and re-configure its capabilities and features to integrate the new service into the system. Moreover, all of the applications and other service platforms collaborating with the service platform must also update and/or re-set their configurations. For example, adding a new service in a M2M system may require defining a new type of resource requiring modifications to the specification. These additional steps cause increased downtime and inefficiency for users.

Moreover, while existing device management (DM) protocols include software management functionality, these DM protocols are not service aware. In other words, these DM protocols are configured only to support downloading and installation of software modules onto devices, e.g., software enabling. These DM protocols, however, are transparent to the service provided by the software module. Also, these DM protocols lack additional management functionality for configuring/integrating services into a service layer for clients of the service layer to use.

In one application, for example, Universal Plug and Play (UPnP) includes a set of protocols that allow network devices seamlessly discover each other and establish functional network services. It is generally understood that UPnP focuses on the application layer and IP layer. UPnP includes methods on how a network device discovers other network devices and also is discovered by other network devices after plug-in. The UPnP also includes how to automatically assign the IP address to the new plug-in device, how a new device automatically sets up the configuration, and how a device recognizes and uses the network services. However, UPnP is not capable of dynamically integrating a new service into the service layer so that all network clients could recognize and utilize the new service.

What is needed in the art is an apparatus and method for configuring and integrating new services into a service layer.

What is also needed in the art is an apparatus and method for dynamically adding a service to a system at the service layer without impacting the operability of the system.

What is also needed in the art is an apparatus and method for dynamically removing and/or deactivating a service in the system at the service layer without impacting the operability of the system.

What is further needed in the art is architecture with management functionality to manage service API.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and apparatus for dynamically adding, activating, deactivating and removing a service in a service layer without impacting system interoperability.

One aspect of the application is directed to a method for adding a service at a service layer in a network. The method includes a step of receiving a request at a service enabler function located in a service layer to add a service. The method also includes a step of reviewing a service description of the requested service to understand its capabilities. Next, a verification request is sent to a service capability located in the service layer. Further, other service layers or applications are notified that the requested service is enabled. In one embodiment, the service description is selected from a service provider ID, service ID, list of dependent services, unique service API, common service API, location of the service, authentication method, authorization and access control information, software module information, protocol support, service compatibility, charging policy and combinations thereof.

Another aspect of the application is directed to a computer-implemented service enabler apparatus located in a service layer of a network for updating a service. The apparatus includes a service coordination function (SCF) configured to coordinate processing and communication with an existing service capability in the service layer, applications, or other service layers. The apparatus also includes a service state management and configuration function (SMCF) that is configured to manage the state transition of the service at a service layer. Further, the apparatus includes a service API management function (SAMF) configured to manage the service API when the service is updated. In one embodiment, the SCF, SMCF and SAMF communicate with each other.

There has thus been outlined, rather broadly, certain embodiments of the invention in order that the detailed description thereof may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1A:
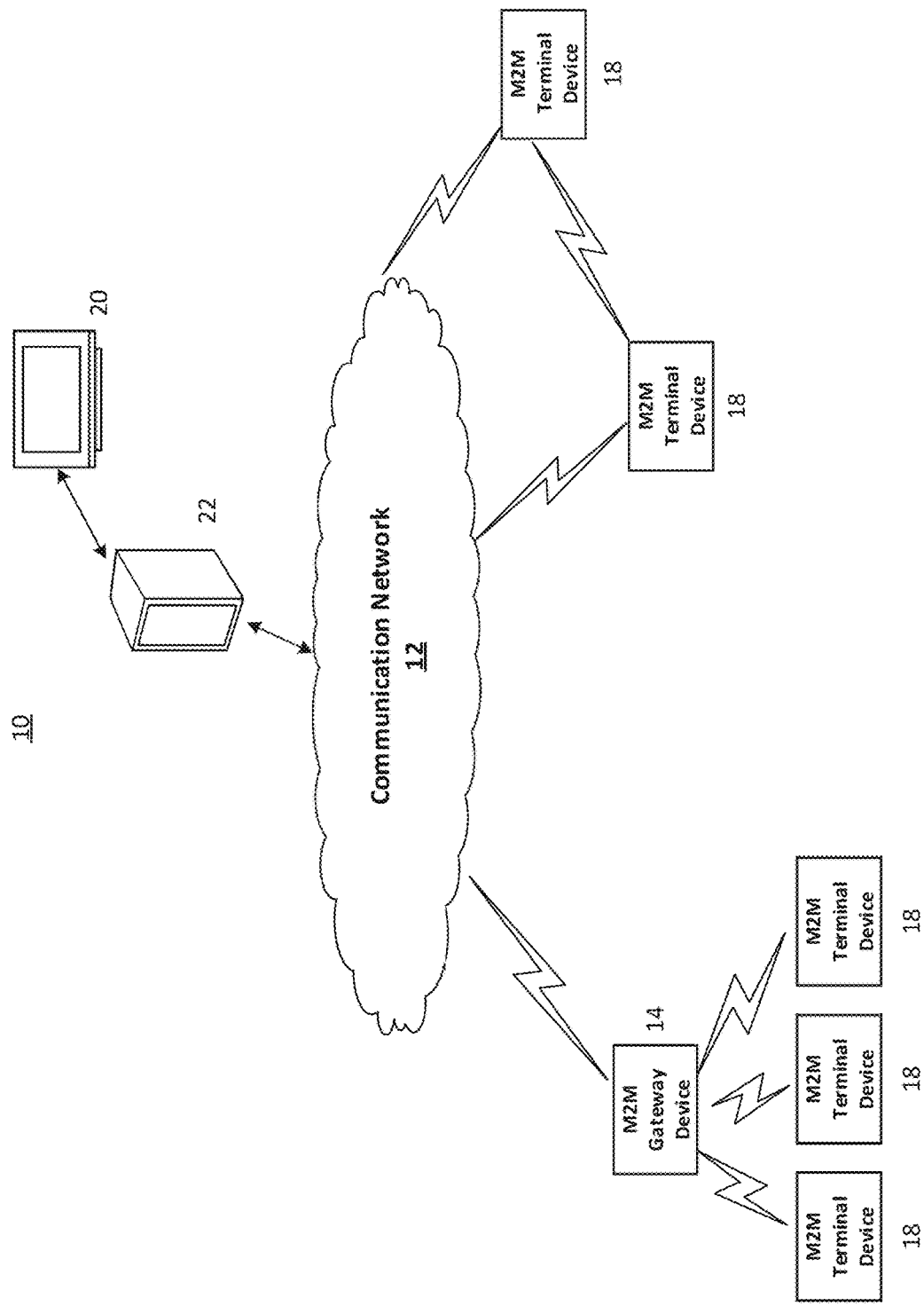
FIG. 1A illustrates an embodiment of a machine-to machine (M2M) or IoT communication system.

A detailed description of the illustrative embodiments will be discussed in reference to various figures, embodiments and aspects herein. Although this description provides detailed examples of possible implementations, it should be noted that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The present application describes a Service Enabler Function within M2M/IoT networks supporting services hosted by a service layer. The Service Enabler Function provides the capability of dynamically adding, activating, deactivating and removing a service or a version of an existing service without impacting system interoperability. In other words, the Service Enabler Function focuses on enabling services at the service layer rather than defining and/or generating a service.

As will be discussed in more detail below, a plurality of services are available at the service layer, which are created at different times, with different requirements. These services should be able to be dynamically managed, e.g., added, activated, deactivated and removed, without impacting system interoperability. According to one embodiment, applications currently using services provided by a service layer are not impacted by new services that are dynamically installed, or by existing services that are updated. According to another embodiment, multiple versions of a service are supported such that different clients can use different versions of the service at the same time. According to even another embodiment, no action is required when a version of a service desiring to be removed from the system has not been used.

Some common terms that will be used throughout this application are provided below:

Network Node: A network addressable entity within a network. A network node may be either a physical, e.g., device, gateway, or server, or a virtual entity in a network.

Service Node: A network node hosting a service layer supporting one or more service capabilities Service Layer: A software middleware layer that supports value-added service capabilities through a set of Application Programming Interfaces (APIs) and underlying networking interfaces.

Service Capability: A specific type of service supported by a service layer

Service Capability Layer: (ETSI) machine-to-machine (M2M) term for a service layer.

Common Service Function (CSF): one M2M term for a service layer.

Common Service Entity (CSE): one M2M term for a service layer.

Platforms

This application is intended to cover platform functionality and support for both application enablement platforms (AEPs) and connected device platforms (CDPs). AEPs include an application enablement layer and a service layer including the world wide web and Internet. The application enablement layer includes but is not limited to the following: (i) servicing APIs, rules/scripting engine; (ii) SDK programming interface; and (iii) enterprise systems integration. The application enablement layer may also include value-added services including but not limited to discovery, analytics, context and events. The service layer including the world wide web and Internet may comprise, for example, analytics, billing, raw APIs, web service interfaces, semantic data models, device/service discovery, device management, security, data collection, data adaptation, aggregation, event management, context management, optimized connectivity and transport, M2M gateway, and addressing and identification. The CDPs may include connectivity analysis, usage analysis/reporting/alerts, policy control, automated provisioning, SIM activation/deactivation, and subscription Activation/Deactivation.

General Architecture

FIG. 1A is a diagram of an exemplary machine-to-machine (M2M) or IoT communication system 10 in which one or more disclosed embodiments may be implemented. Generally, M2M technologies provide building blocks for the IoT, and any M2M device, gateway or service platform may be a component of the IoT as well as an IoT service layer, etc.

As shown in FIG. 1A, the M2M/IoT communication system 10 includes a communication network 12. The communication network 12 may be a fixed network or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular, as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN, e.g., Zigbee, 6LoWPAN, Bluetooth, direct radio link, and wireline for example. The illustrated M2M service platform 22 provides services for the M2M application 20, M2M gateway devices 14, M2M terminal devices 18 and the communication network 12. It will be understood that the M2M service platform 22 may communicate with any number of M2M applications, M2M gateway devices 14, M2M terminal devices 18 and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 1B:
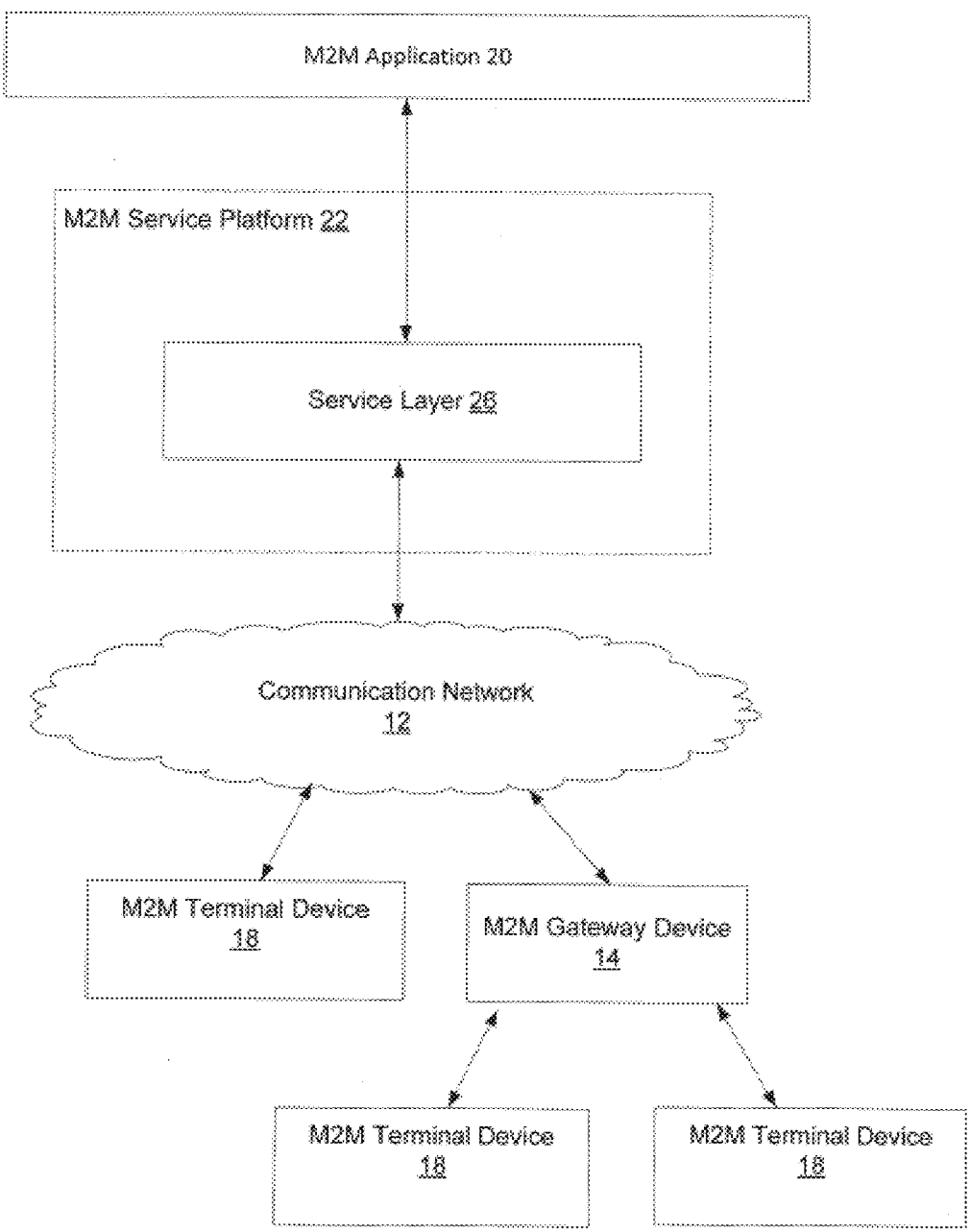
FIG. 1B illustrates an embodiment of a M2M service platform.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, M2M gateway, etc.

Referring also to FIG. 1B, the M2M service platform typically implements a service layer 26, e.g., a network service capability layer (NSCL), that provides a core set of service delivery capabilities that diverse applications and verticals can leverage. These service capabilities enable M2M applications 20 to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides. In one embodiment, a user interface may be used to indicate a new service to be enabled at the service layer. In another embodiment, the user interface may be used to indicate a new service that has been enabled at the service layer.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'. Moreover, the M2M service layer may also be configured to interface with other devices such as mobile devices and M2M servers/gateways as discussed in this application and illustrated in the figures.

According to an aspect of the application, the method of managing registration may be implemented as part of a service layer. The service layer is a software middleware layer that supports value-added service capabilities through a set of Application Programming Interfaces (APIs) and underlying networking interfaces. Both ETSI M2M and oneM2M use a service layer that may contain this method. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE) which can be hosted on different types of network nodes, e.g., infrastructure node, middle node, application-specific node. Further, the method of searching and discovering service layers as described in the present application can be implemented as part of an M2M network that uses a Service Oriented Architecture (SOA) and/or a resource-oriented architecture (ROA) to access services related to management of discovery, registration and de-registration from a service layer.

Figure 1C:
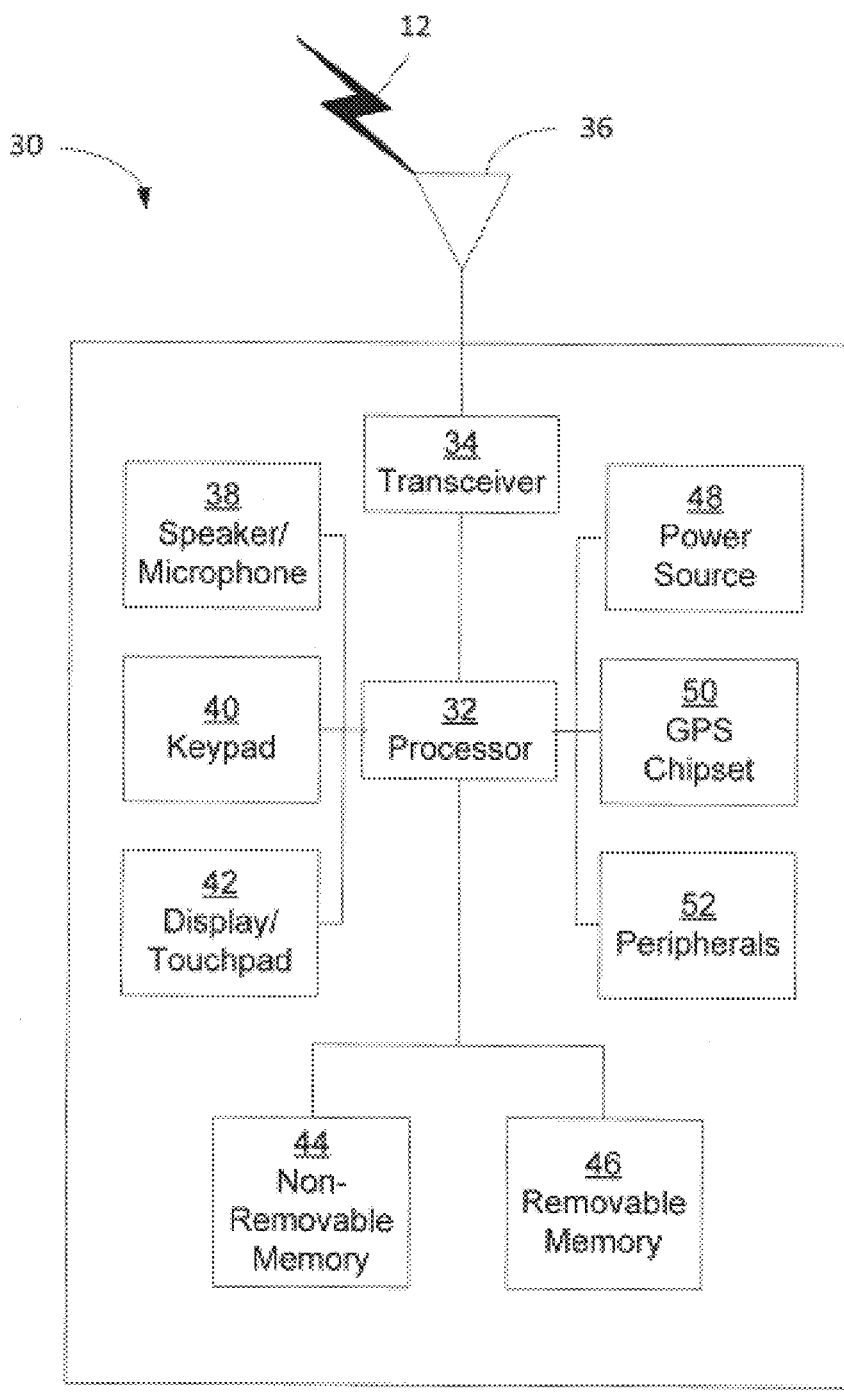
FIG. 1C illustrates an embodiment of a system diagram of an example M2M device.

FIG. 1C is a system diagram of an example M2M device 30, such as an M2M terminal device 18 or an M2M gateway device 14 for example. As shown in FIG. 1C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for embedded semantics naming of sensory data.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
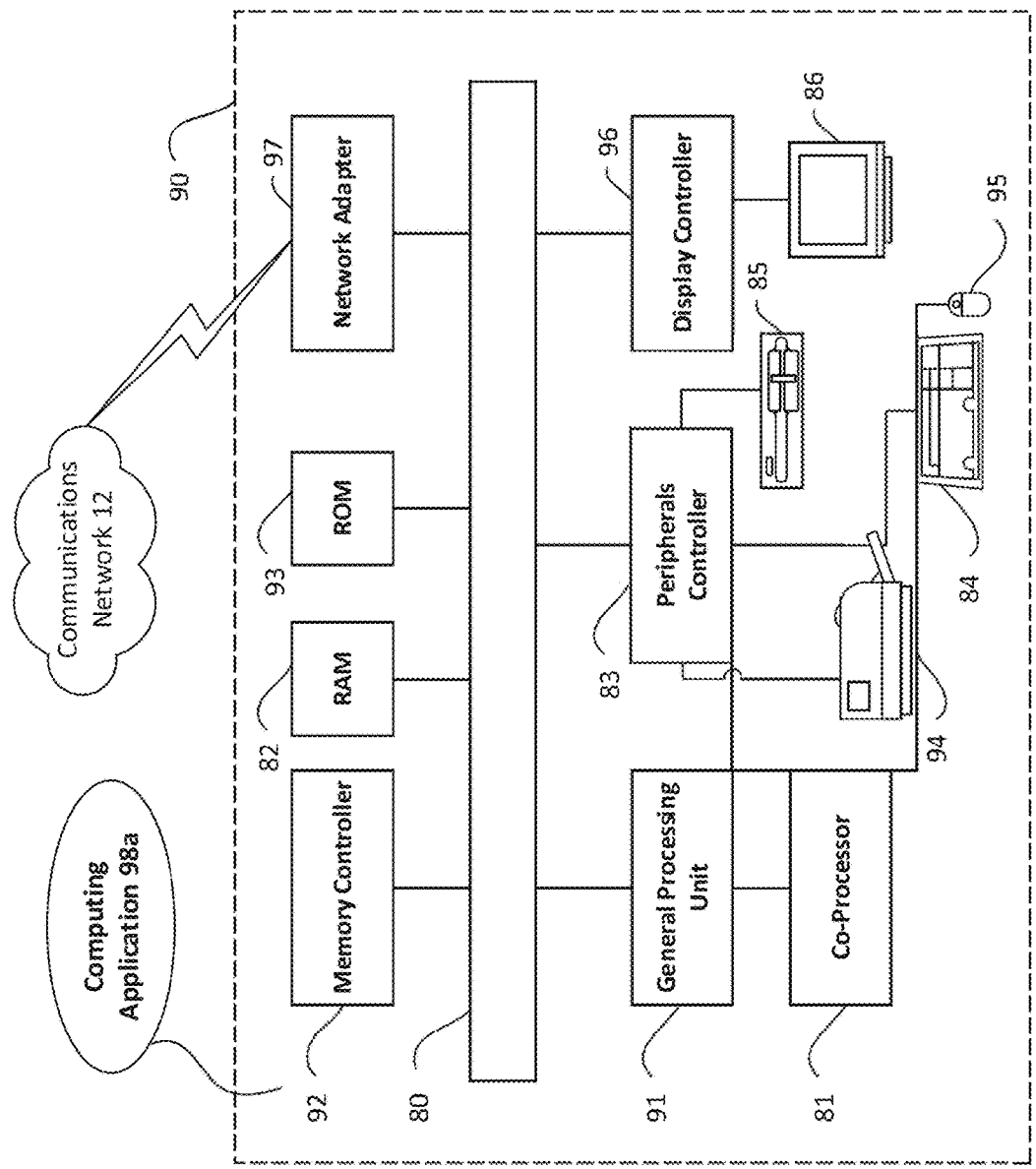
FIG. 1D illustrates an embodiment of a block diagram of an exemplary computing system.

FIG. 1D is a block diagram of an exemplary computing system 90 on which, for example, the M2M service platform 22 of FIG. 1A and FIG. 1B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 1A and FIG. 1B.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Service Layer

Figure 2A:
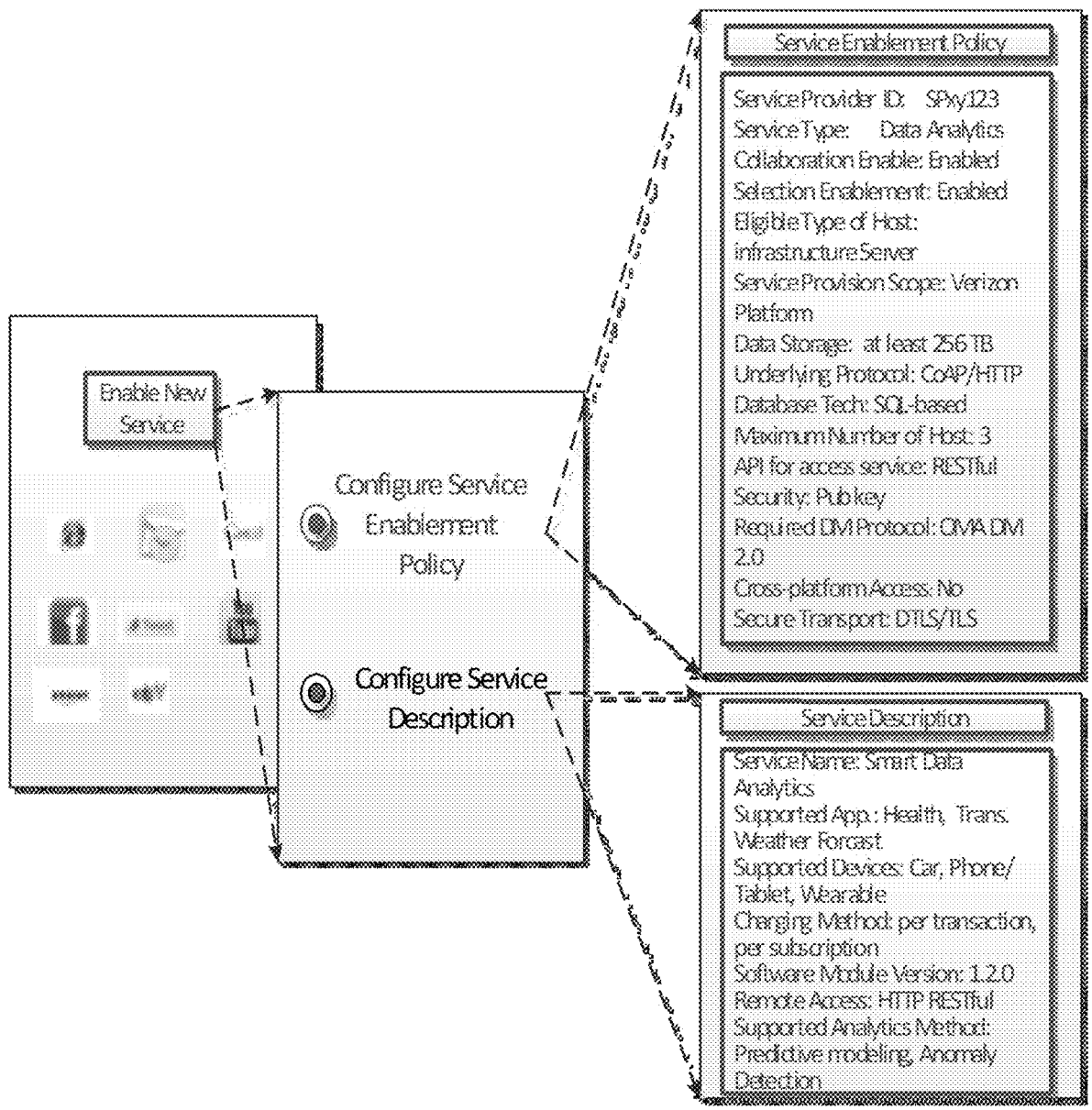
FIG. 2A illustrates a user interface of configuration for updating a new service according to an embodiment of the application.

In one embodiment, a graphical user interface as illustrated in FIG. 2A may be employed for enabling a new service. The new service may be, for example, a Facebook or eBAY application. As shown, the service enablement policy or service description may be enabled for new services, e.g., applications. In one embodiment, the user interface may be implemented enabling or disabling certain features defining a new service.

Figure 2B:
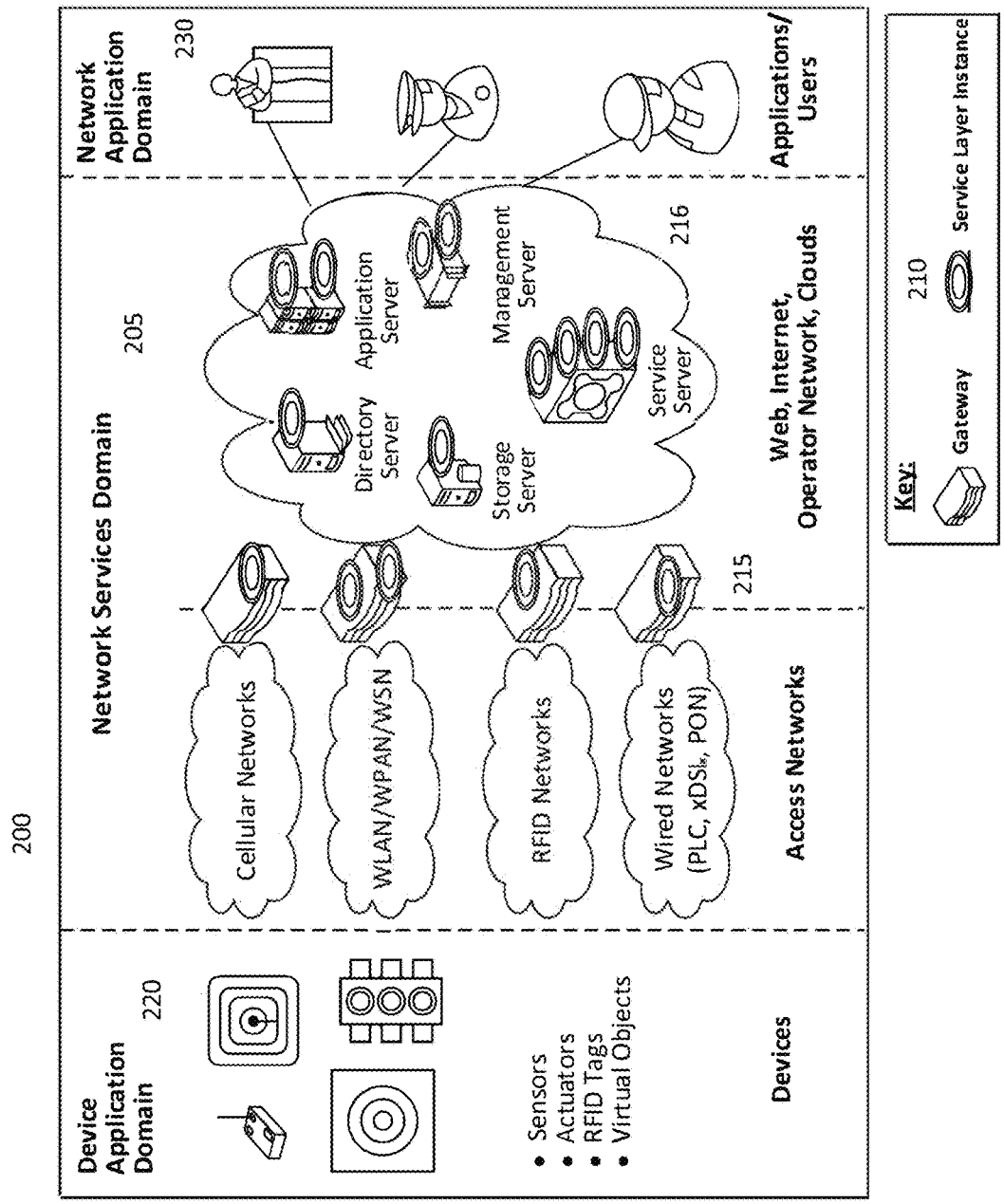
FIG. 2B illustrates an embodiment of a deployment scenario of a service layer within a network.

Service layer functions, also known as simply service layers, generally are understood in the art to be layered below Application(s) and above an application protocol layer, e.g., HTTP, COAP, etc. Service layers provide value added services to client applications. Service layers are often categorized as 'middleware' services. According to an embodiment, FIG. 2B illustrates a deployment scenario of a system 200 including a service layer 210 within a network—network services domain 205—of a system 200. The service layer 210 is deployed on various network nodes—gateways 215 and servers 216—to provide value-added services to network applications, the web, Internet, Operator Networks, the Cloud, device applications as well as to the network nodes themselves. In FIG. 2B, the gateways 215 may include cellular networks, WLAN/WPAN/WSN, RFID networks and wired networks such as PLC, xDSL and PON. The servers 216 may include a directory server, application server, storage server, management server and service server. The system 200 may also include a device application domain (DAD) 220 including sensors, actuators, RFID tags and virtual objections. The system 200 may include a network application domain 230 including applications and users.

In one embodiment, an M2M/IoT service layer is an example of one type of service layer specifically targeted to providing value-added services for M2M/IoT type devices and applications. Several industry standards bodies, e.g., ETSI M2M and oneM2M, have been developing M2M/IoT service layers to address the challenges associated with integration of M2M/IoT types of devices and applications into deployments such as the Internet/Web, cellular, enterprise, and home network.

An M2M service layer can provide applications and devices access to a collection of M2M centric capabilities supported by the service layer. A few examples include security, charging, data management, device management, discovery, provisioning, and connectivity management. These capabilities are made available to applications via APIs which make use of message formats, resource structures and resource representations defined by the M2M service layer.

OneM2M Service Layer

Figure 3:
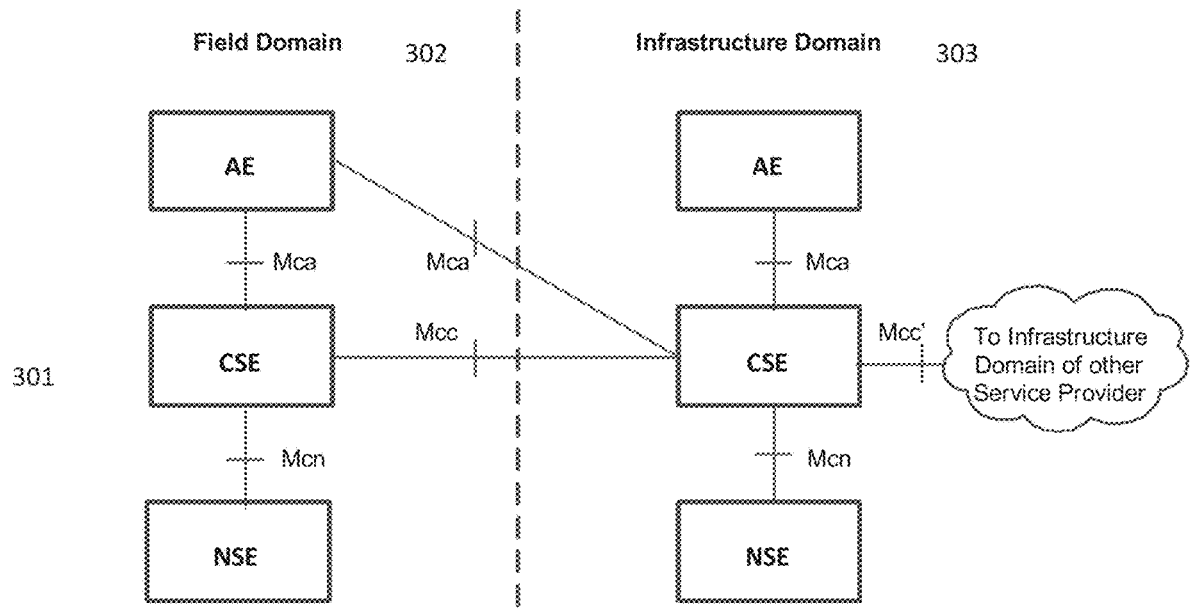
FIG. 3 illustrates an embodiment of a set of one or more particular types of Common Service Functions.

In another embodiment, oneM2M is employed to develop technical specifications that address the needs for a common M2M Service Layer that can be readily embedded within various hardware and software. In addition, it can be relied upon to connect a wide variety of devices in the field with M2M application servers worldwide. The one M2M common services layer supports a set of Common Service Functions (CSFs), e.g., service capabilities, as shown in FIG. 3. An instantiation of a set of one or more particular types of CSFs is referred to as a Common Services Entity (CSE) 301 which can be hosted on different types of network nodes, e.g., infrastructure node, middle node, application-specific node. As shown, the CSE 301 is hosted in the Field domain 302 and the infrastructure domain 303.

According to another embodiment, OneM2m is developing the service layer in two architectural approaches—Resource Oriented Architecture (RoA) and Service Oriented Architecture (SoA). In the oneM2M RoA RESTful architecture, CSFs are represented as a set of "resources." A resource is defined as a uniquely addressable element in the architecture having a representation that can be manipulated via RESTful methods such as Create, Retrieve, Update, and Delete. These resources are made addressable using Universal Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

Figure 4:
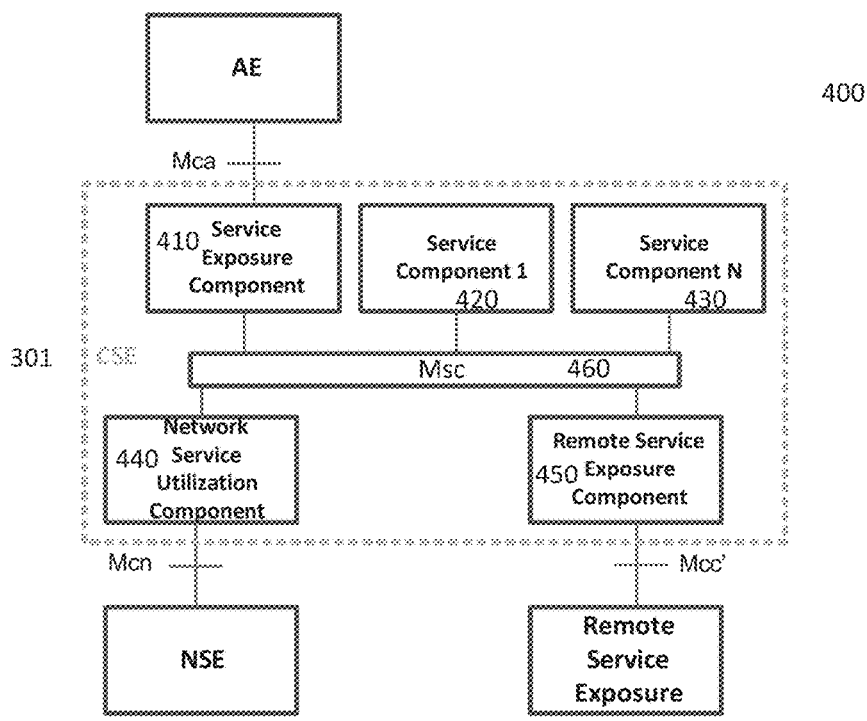
FIG. 4 illustrates an embodiment of a service layer architecture.

On the other hand, the SoA architecture legacy deployment is not RESTful based. Rather, it re-uses largely the same service layer architecture 400 as shown in FIG. 4. Here, the CSE 301 is indicated by a dotted line. The CSE includes various M2M services including, for example, a service exposure component 410, a service component I 420, a service component N 430, a network service utilization component 440 and a remote service exposure component 450. In addition to existing reference points, the CSE 301 may include an inter-service reference point Msc 460. Communications between M2M Service components passing over the Msc reference point utilize a web services approach, e.g., Web Services Message Exchange Patterns (MEP).

Universal Plug-n-Play

According to another embodiment, the present application is readily applicable to Universal Plug and Play (UPnP) architecture. UPnP is a set of networking protocols that permit networked devices, such as personal computers, printers, Internet gateways, Wi-Fi access points and mobile devices to seamlessly discover each other's presence on the network and establish functional network services for data sharing, communications, and entertainment. UPnP is intended primarily for residential networks without enterprise-class devices, and focuses on IP layer and application layer to dynamically plug-in a device. UPnP uses common Internet technologies. It assumes the network must run Internet Protocol (IP) and then leverages HTTP, SOAP and XML on top of IP, in order to provide device/service description, actions, data transfer and eventing. UPnP networking includes multiple steps such as: IP addressing, discovery, description, control, eventing and presentation.

Device Management (DM) Protocols

As generally understood in the art, DM protocols provide the dynamic device management functions, such as firmware management and software module management on a device. For instance, OM ADM is a protocol for device management designed by Open Mobile Alliance. It's widely used in the remote management of mobile devices. It is composed of a number of specifications including protocol, architecture, underlying network binding etc. In the most common scenario, by implementing OMA DM specifications, the DM Server is able to do remote management on devices with DM Clients such as for example mobile phones. These devices may also include sensors, actuators, and gateways. With implementation of the Management Object and the DM Client, the DM Server can perform remote management on devices.

Another DM protocol is the Software Component Management Object (SCOMO). SCOMO enables remote software component management within a device. Management may include but is not limited to functions such as downloading, installation, updating, removal, activation/de-activation and retrieval of inventory of software component(s).

Yet another DM protocol is BBF TR-069. This protocol defines CWMP protocol between a Customer Premises Equipment (CPE) and on Auto-Configuration Server (ACS). ACS is a centralized server in the network, while CPE may include home routers, set-top boxes, and end devices. The CWMP manages a set of CPE devices including but not limited to the following functions: (i) Auto-configuration and dynamic service provisioning; (ii) Software/firmware image management; (iii) Status and performance monitoring; and (iv) Diagnostics. The software module management enables the management of modular software and execution environment, including software module install, update, uninstall and notification. The software module management also has the ability to start and stop applications on CPE, enable and disable execution environments, and inventory the available software module on the device.

A further DM protocol includes a Device Management (DMG) CSF in CSE. This is responsible for providing management of device capabilities on Middle Nodes (M2M Gateways), Application Service Nodes and Application Dedicated Nodes (M2M Devices) as well as devices that reside within an M2M Area network. The DMG may utilize existing device management technologies, e.g., TR-069 and OMA-DM, in addition to management of a CSE across the Mcc reference point. To perform the translation and adaptation functions, the DMG has a functional component called a Management Adapter. The Management Adapter performs the adaptation between the DMG and Management Servers (or Management Client) in the underlying NSE.

Service Enabler Architecture

Figure 5:
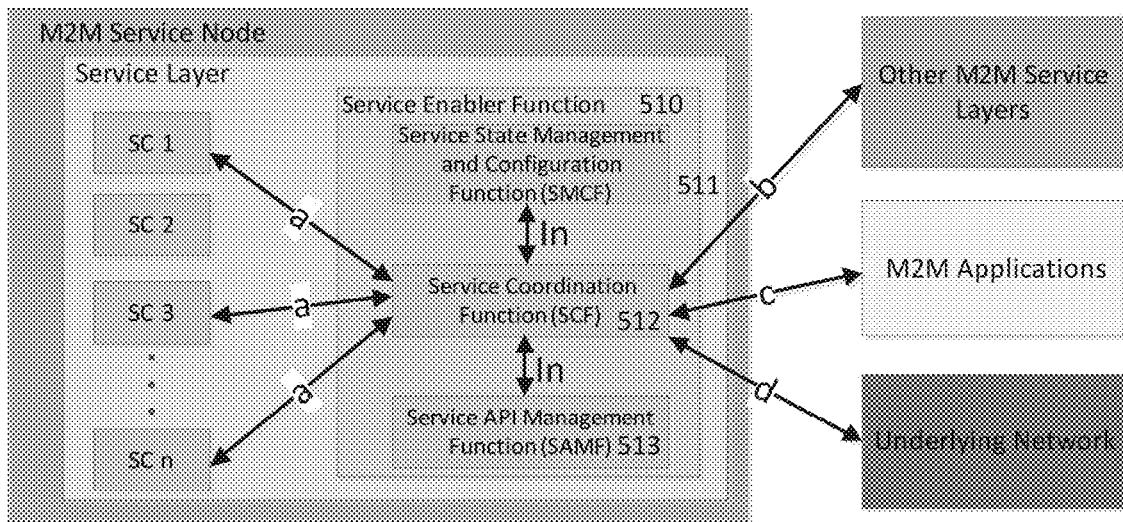
FIG. 5 illustrates an embodiment of a Service Enabler Function at the service layer.

According to one aspect of the application, as illustrated in FIG. 5, for example, there is an architectural view of Service Enabler Function 510 at the service layer 500. It may provide the following high level functionalities: (i) check module authentication; (ii) check node resources; (iii)

check interoperability with existing modules; (iv) check policy and rights to determine how to handle conflicts e.g., do not register new module or deregister existing module, etc.; (v) register new module; (vi) add new service(s) due to new module to list of services; (vii) modify API support to reflect new service capabilities; and (viii) modify inter-module communications to incorporate new module. In one embodiment, registration and security services may be employed to add/activate/deactivate/remove any service. The SEF includes sub-functions and communications with network entities, e.g., service capability, M2M applications and M2M service layers, over reference points. The Service Enabler Function includes three (3) main sub-functions described below in more detail.

The first sub-function is a Service State Management and Configuration Function (SMCF) 511. The role of the SMCF is to manage the state transition of a service at a service layer, and to configure the capabilities and features of the service. If there are multiple versions of a service, SMCF is responsible for managing the status and configuration of each version of the service.

The second sub-function is a Service Coordination Function (SCF) 512. The role of SCF is to coordinate process and communications between Service Enabler Function and service capabilities, M2M applications and other M2M service layers when Service Enabler Function leads the effort for adding, activating, deactivating or removing a service. In addition, SCF cooperates with SMCF and SAMF within the Service Enabler Function.

The third sub-function is a Service API Management Function (SAMF) 513. The role of SAMF is to dynamically manage the service API when a service is added, activated, deactivated or removed. Service API implies the functionality and features of a service. Clients such as for example, application or other service layers, may recognize a service by retrieving information from the Service API, and utilize the service by accessing the service API. Different services may have different service APIs, which are defined by the entity providing the service. In one embodiment, accessing the service API and determining where the service API resides are performed by the service layer, and not by service API itself.

For example, the service API of a SoA-based temperature reporting service may be configured to retrieve the temperature with the location and time as parameters. In addition, the service API could also provide the function that calculates the average temperature and returns the highest/lowest temperature with starting time and ending time as parameters. Another example is the RoA-based location service, and the service API provides a list of resources wherein the access control attribute defines a set of users that are allowed to retrieve the location information, and the frequency attribute indicates how often to report and update the latest location.

Table 1 below summarizes the messages exchanged over different reference points during the service enabling process. A service enabling process means the process to add, activate, deactivate or remove a service at the service layer. M2M applications, other M2M service layers and underlying network may send Service Enabling Request to Service Enabler Function to trigger the service enabling process. Note that in the case that underlying network triggers the service enabling process; it could directly send Service Enabling Request to Service Enabler Function. Alternatively, it may also send Service Enabling Request to device management SC first, and DM SC relays the request to Service Enabler Function to initiate the service enabling process.

TABLE 1

| Message | Reference Point | Requester | Receiver | Description |
|---|---|---|---|---|
| Service Capability Verification Request | a | SCF | Service Capability | SCF requests a service capability to verify if the service enabling process is allowed and supported by the service capability. |
| Service Capability Verification Response | a | Service Capability | SCF | Service Capability returns the results of verification to SCR |
| Service Enabling Request | b | Other M2M Service Layer | SCF | Other service layer requests to add, activate, deactivate or remove a service in this service layer. |
| Service Enabling Notification | b | SCF | Other M2M Service Layer | SCF notifies other service layer the results of service enabling process, which may impact other service layer. |
| Service Enabling Request | c | Application | SCF | Application requests to add, activate, deactivate or remove a service in this service layer. |
| Service Enabling Notification | c | SCF | Application | SCF notifies application the results of service enabling process, which may impact the application. |
| Service Enabling Request | d | Underlying Network | SCF | Underlying network requests to add, activate, deactivate or remove a service in this service layer. |
| Service Enabling Notification | d | SCF | Underlying Network | SCF notifies the underlying network the results of service enabling process. |
| Service State Update Request | In | SCF | SMCF | SCF requests SMCF to update the service state. |

TABLE 1-continued

| Message | Reference Point | Requester | Receiver | Description |
|---|---|---|---|---|
| Service State Update Response | In | SMCF | SCF | SMCF returns the response after updating the service state. |
| Service Description Parsing Request | In | SCF | SMCF | SCF requests SMCF to parse the service description to understand the capability and feature of a service. Mainly for adding a new service process. |
| Service Description Parsing Response | In | SMCF | SCF | SMCF returns the results of parsing the service description to SCF. Mainly for adding a new service process. |
| Service API Management Request | In | SCF | SAMF | SCF requests SAMF to update the service API during the service enabling process. |
| Service API Management Response | In | SAMF | SCF | SAMF returns the results of managing service API to SCF. |

Table 2 highlights some critical information in each of the messages defined in Table 1. In the table, the Service ID and/or Service Provider ID are not specified since these IDs are common for all types of messages.

TABLE 2

| Message | Key information in Message |
|---|---|
| Service Capability Verification Request | Service enabling action: add, activate, deactivate or remove<br>What service capability is considered, e.g. charging, security, etc.<br>Features and methods of the service about the related service capability, e.g. charging model, charging rate, charging event |
| Service Capability Verification Response | Service enabling action: add, activate, deactivate or remove<br>Verification results: indicate if the features and methods of the service is enabled and allowed by the service layer |
| Service Enabling Request | Service enabling action: add, activate, deactivate or remove<br>Service description: a template to describe the capability and features of the service<br>Software module: this is optional<br>Link (URI) to download software module |
| Service Enabling Notification | Service enabling action: add, activate, deactivate or remove<br>Latest state of the service<br>Link or method to retrieve capability and feature of the service |
| Service State Update Request | Service enabling action: add, activate, deactivate or remove |
| Service State Update Response | State management result: the new state of the service |
| Service Description Parsing Request | Service enabling action: add, activate, deactivate or remove<br>Service description: a template to describe the capability and features of the service |
| Service Description Parsing Response | Service enabling action: add, activate, deactivate or remove<br>Capability and features of the service by parsing the service description |
| Service API Management Request | Service enabling action: add, activate, deactivate or remove<br>Management action: create, update or remove a service API<br>Service description: a template to describe the capability and features of the service. This is only contained for adding a new service<br>What content needs to update in service API if management action is to update<br>Link or method to access the service API |

TABLE 2-continued

| Message | Key information in Message |
|---|---|
| Service API Management Response | Service API management is successful or not<br>Link or method to access the updated service API |

Service State Management and Configuration Function (SMCF)

Figure 6:
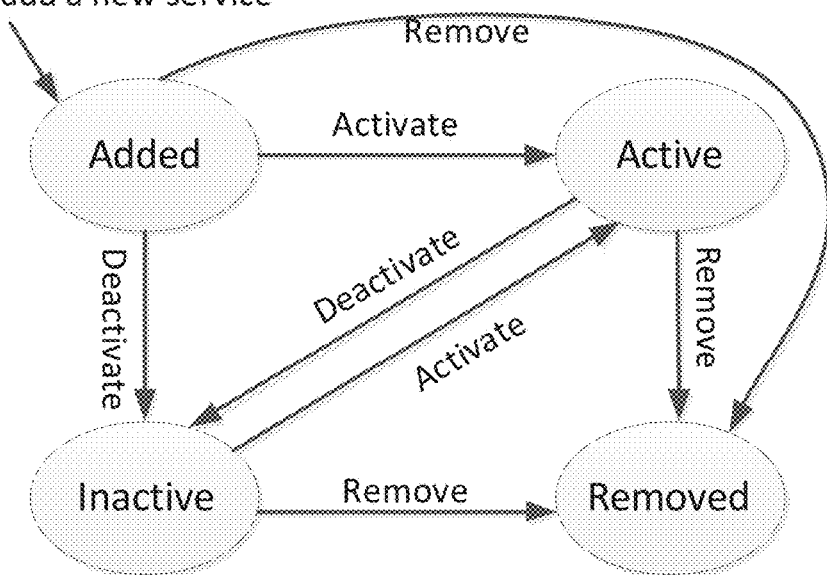
FIG. 6 illustrates an embodiment of plural state transitions for a service.

One of the major roles of SMCF is to manage the state transition of a service at the service layer. FIG. 6 describes four main states of a service at the service layer and the state transitions among these four states. One of the states is 'Added'. In the 'Added' state, the service is inserted into the system for the first time, but is not ready for use. According to this application, addition means that the capabilities and features of the service can be recognized/discovered by entities within the service layer as well as external entities, such as applications and other service layers. The service layer may not discover the new service until it is added, e.g., during the process of adding a new service, or the service layer obtaining some knowledge of the new service by parsing the service description. The request of adding a new service may come from an external entity, such as an application and a third party service provider. If the process of adding a new service fails, there is no state maintained for the new service, because the service is not successfully added and cannot be recognized by service layer.

Another state is the 'Active' state. In the Active state, the service is ready for use. With the 'activate' operation, the status of a service moves to 'Active' state from either 'Added' or 'Inactive' state. Yet another state is the 'Inactive' state. In the Inactive state, a service is already in the system, but is not ready for use due to some reasons. For example, an older version of a service is replaced and upgraded to a new version. The older version may be employed for backup and tracking purposes. In other words all of the information of the older version is maintained. With the 'deactivate' operation, the status of a service moves to 'Inactive' state from either 'Added' or 'Active' state. A further state is the 'Removed' state. In the Removed state, a service is completely removed from the service layer, which means external applications and service layers cannot discover the service through service discovery mechanism. With the 'Remove' operation, the status of a service moves to the 'Removed' state from any of the three above-mentioned states. According to one embodiment, the state and information of the service may be maintained at the service layer internally for the purpose of tracking and statistics.

In another embodiment, a major role of the SMCF may be to describe the service and configure the capabilities and features of a service, so that the service could be recognized and utilized by clients, e.g., applications and other service layers. The service description may provide important information of the service. This may be separate from the software module. Service description may include one or more of the following attributes: (i) service provider ID, (ii) service ID; (iii) list of dependent services; (iv) services API (unique service API or common service API); (v) location of service; (vi) authentication method; (vii) Authorization and Access Control Information; (viii) software module information; (ix) Protocol Support; (x) service compatibility; and (xi) Charging Policy. A description of each attribute is provided below.

Service provider ID: This attribute specifies who owns and provides the service. For example, in oneM2M system, an M2M Service Provider is global uniquely identified by the M2M Service Provider Identifier (M2M-SP-ID). This is a static value assigned to the Service Provider.

Service ID: This attribute specifies the identification of a service. The Service ID is an identifier of a M2M Service offered by an M2M Service Provider or an application, e.g., service ID is defined the entity that provides the service. For example, a service ID may consist of three segments. Segment 1 indicates if an application or a service provider that defines the service. Segment 2 indicates the application ID or service provider ID. Segment 3 indicates the category of service, such as social networking, emergency or sensor-based service.

List of Dependent Services: This attribute specifies a list of services/functions that this service is dependent upon and the corresponding versions of these services that this service is compatible with.

Figure 7:
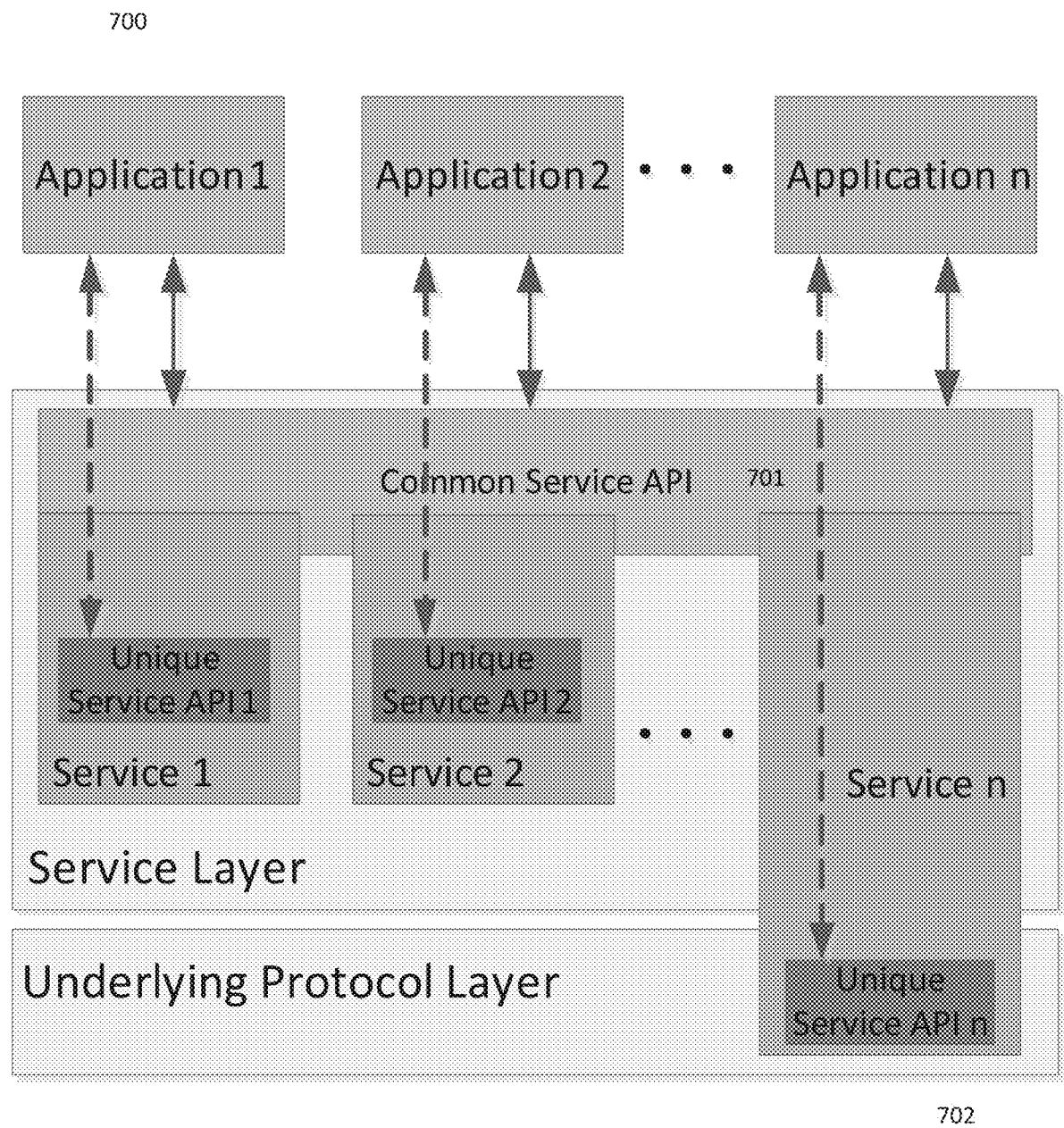
FIG. 7 illustrates an embodiment of a Service API for a service.

Service API: This attribute specifies that the Service API for a service is split into two parts. This is shown in the embodiment of FIG. 7. The two parts are the common service API 701 and the unique service API 702 in the service layer 700. Common Service API specifies some common capabilities and features of the service. 'Common' means these capabilities and features of the service is the same as or similar with that of other services, such as software module management, charging and security. Usually, the Common Service API includes the capabilities and features of all services hosted in service layer, and applications use the Common Service API to know about and utilize the service. On the other hand, Unique Service API specifies some unique capabilities and features of the service. Each service may have some unique features that other services do not have. For example, image processing services may provide a unique feature to compress the image according to a special technique. Unique Service API may have capability and feature for a service layer, and it may also have capability and features provided by underlying protocol layer. For example, in oneM2M, device management service has some capabilities provided by DM protocol in the underlying Network Service Entity (NSE). These capabilities are exposed to service layers through DMG CSF in CSE.

In one embodiment, to utilize a service, a client needs to first use the Common Service API of the service to retrieve some information, and then uses the Unique Service API to access and/or utilize the service if necessary. The Common Service API may include the method or link for client on how to access and use the Unique Service API. In some cases, however, it is not needed for a client to use the Unique Service API, since the Unique Service API may contain some internal capabilities that the service consumers do not care about. In this case, the Unique Service API plays as a black box for the client. For example, the Unique Service API of image processing service includes some attributes or parameters to indicate how to do the image compression, but the clients using the service does not need to know these parameters, so they won't use the Unique Service API. In another example, device management service at a service layer has the Unique Service API in the underlying DM protocol, but the devices using the DM service do not need to know the Unique Service API.

Location of Service: This attribute specifies where the service is added. This attribute is used to help clients locate the service, do the service discovery and to utilize the service. For example, in a oneM2M system, a service may be added in an infrastructure node or a middle node.

Authentication Method: This attribute specifies the authentication methods used for two purposes. A first purpose is when the client that wants to use this service performs the authentication method. A second purpose is when the service layer upon the service being enabled or disabled performs the authentication method.

Authorization and Access Control Information: This attribute specifies the authorization method and access control information of the service for the clients that want to use the service.

Software Module Information: This attribute specifies the information of the software module that is used to support the service in service layer and/or underlying protocol layers, such as for example, the software module ID, size, version and user instruction. This attribute is used for version control and software module management purpose.

Protocol Support: This attribute specifies what types of protocols are required at service layer and underlying network to support this service, e.g., HTTP/CoAP at application protocol layer, TCP/UDP at transport layer.

Service Compatibility: This attribute specifies compatibility of the version of the service with respect to previous versions.

Charging Policy: This attribute specifies how the service performs the charging process, such as the charging model, charging event and charging rate.

Service Coordination Function (SCF)

According to an embodiment, during the process of adding, activating, deactivating and removing a service, Service Enabler Function needs to communicate with existing service capabilities, applications and/or other service layers. Tables 1 and 2 summarize the message exchange between SCF and other entities over different reference points. Specifically, SCF is responsible to drive and coordinate the following communications regarding any update of a service in the service layer:

SCF communicates with Service State Management and Configuration Function (SMCF) and with Service API Management Function (SAMF) within the Service Enabler Function. For instance, SCF initiates the communication with SMCF when there is a request to update, e.g., add, activate, deactivate or remove, the status of a service, so that SMCF may update the state of the service, and configure the capability and feature of the service. SMCF will return the result of configuration and state management to SCF, which uses the results to initiate the next step operations.

Moreover, the SCF initiates the communication with the SAMF to update the service API for the service that is updated, e.g., add, activate, deactivate or remove. The SCF sends the service information to the SAMF. In turn the SAMF updates the Service API accordingly.

In another embodiment, communications may also be conducted with existing Service Capabilities within the service layer. The purpose is to make sure that the status update follows the policies of the service layer. Moreover, the purpose is to ensure the capability and features of the service are enabled and supported by the service layer. For example, when there is a new version, the SCF contacts security function/service to verify that the security algorithm used by the new version is supported in the service layer. The SCF also needs to communicate with software module management so that the software module information may properly be managed and tied with the service.

In a further embodiment, the SCF communicates with applications and other service layers that are registered with the service layer. By so doing, they become aware of the update of the service. For example, when a service is deactivated for maintenance, the SCF needs to notify those applications and other service layers that are or were using the particular service.

In yet a further embodiment, the SCF communicates with the underlying network for notification of a service enabling process driven by the Service Enabler Function. For example, when a new service is added, the SCF notifies the underlying network. By so doing, the DM protocol in the underlying network downloads and installs the software module to support the new service.

Service API Management Function (SAMF)

According to an embodiment, SAMF is responsible for managing the Service API of a service that is added, activated, deactivated or removed in the service layer. By managing the Service API, the service may be recognized/discovered and utilized. For example, in RoA, the resource represents the capabilities and features of a service. Meanwhile, in SoA, the functions may be called to retrieve the features of the service and to use the service.

Each service has its distinct Service API defined by the entity that provides the service. As discussed above, a service API contains Common Service API and Unique Service API. The SAMF is responsible for managing both types of Service APIs for a service in order to make the service visible to clients.

The SAMF may have one or more following functionalities to manage the Service API (Common and Unique Service API). According to one functionality, the SAMF may be capable of integrating the Service API into the overall API of service layer. Namely, when the service is added to the system, its Common Service API should be integrated into the overall Common API of service layer and be used by clients, e.g., applications, other service layers, etc. For example, for RoA-based services, the service API may be resources. The SAMF may link the resources into the overall resource tree of the service layer, and provide the link to access the resource.

Meanwhile, for SoA-based service, the SAMF may modify the common functions maintained by service layer, so that the common service functions of the service can be called by the common service layer functions. Integration also means that the Unique Service API is integrated into service layer, and may at least be visible to clients through the service layer.

According to another functionality, the SAMF may be capable of complementing service API by adding new functionality. Based on the service API, the SAMF may add new functionality to the service API which is not supported by the service itself but rather is supported or required by the service layer. For example, a Service Enabler Function may provide access control to a service that it does not natively support. In an exemplary embodiment For RoA-based service, access control is added to the resource of the service. Access control may be implemented through a function or some parameters in the function.

According to another functionality, the SAMF may be capable of translating service API. For example, services may be created and provisioned in different environments. When the service is integrated into the service layer, the service layer may translate service API so that the service API is compatible with other services hosted in the service layer. Moreover, it is compatible with applications that are using the services in the service layer. In an exemplary embodiment, there may be multiple types of translation. For instance, translation may be between RoA-based resource and SoA-based functions whereby common API provided by a service layer translates the service resource in RoA to the service functions in SoA, and vice versa. Translation may also be between a RESTful resource and a non-RESTful resource whereby a service layer common API translates the RESTful resource of a service to the non-RESTful resource for a service, and vice versa. Each of the above-mentioned functionalities may be applied to all services hosted by the service layer. For example, translation functionality could be in terms of the function 'CommonTranslation', e.g., service API, original format, targeted format. This means the common translation function translates the service APIs in 'original' format, e.g., SoA-based function, to a 'targeted' format, e.g., RoA-based RESTful resource.

Service Enabler Methods

According to another aspect of the application, there is described one or more methods for adding, activating, deactivating and/or removing a service within M2M/IoT networks. As will be understood in more detailed below, the methods employ architecture of the Service Enabler Function described above.

According to an embodiment, a method for adding a new service into the service layer is described. In particular, the Service Enabler Function coordinates communication within a service layer and with external entities, such as for example, applications and other service layers. By so doing, the new service may seamlessly be integrated into the service layer. Moreover, the new service may be organized and utilized by clients such as applications and other service layers.

Figure 8:
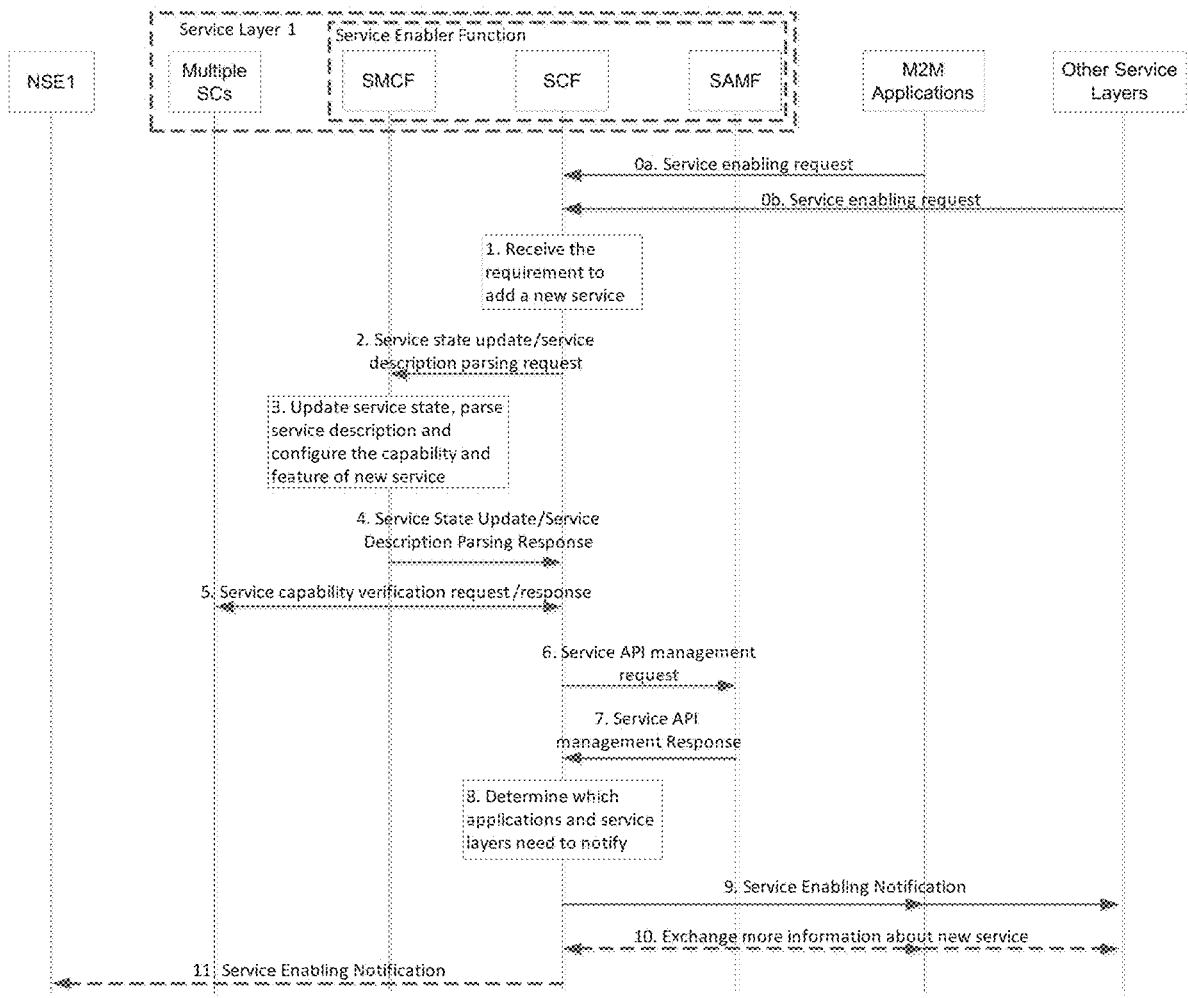
FIG. 8 illustrates an embodiment of a method for adding a new service.

According to an exemplary embodiment, FIG. 8 explains how the information exchange operations for adding a new service are employed with respect to the instant application. Each of the steps in FIG. 8 is denoted by a numeral, e.g., 0, 1, 2, etc. In Step 0, possible sources that may trigger the service enabling process are described. There are 2 cases that may trigger the process for adding a new service: In Step 0a, a M2M application wants to define and provide a new service. In this case, the application sends the Service Enabling Request to SCF over reference point 'c' as shown in FIG. 5, which may include the requested action to add a service. In an alternative embodiment, the application may provide a link to retrieve the software module, any protocol or entity, e.g., DM protocol, in order to download and install the software module.

According to another embodiment, instead of, or in combination with Step 0a, a service provider defines and provides a new service for service consumers as shown in Step 0b. In this case, SCF may get the Service Enabling Request from other another service layer over reference point 'b' as shown in FIG. 5. Alternatively, the SCF may get the Service Enabling Request from underlying NSE over reference point 'd' as shown in FIG. 5. The service enabling request may indicate the requested action, e.g., add, activate, deactivate or remove a service, and contain the service description.

Next, in Step 1, the SCF receives a request to add a new service from external entities, e.g., application or service provider. If the new service is defined by an application, the application needs to provide both a software module and service description to the Service Enabler Function. If the new service is defined by a service provider, a service description is required for the service enabling process. Service provider may not have to provide the software module to the service layer.

In Step 2, the SCF sends a request message to SMCF over reference point 'In' within the Service Enabler Function as shown in FIG. 5. The requested message combines the Service State Update Request and the Service Description Parsing Request. According to the Service State Update Request, SCF indicates the new state. In this case, it is to add a new service. Moreover, the Service Description Parsing Request includes the service description of the new service.

In Step 3, the SMCF updates the state of the new service to 'Added. SMCF then parses the service description to understand the capabilities and features of the new service. For example, SMCF understands and determines whether the new service is an updated version of an existing service by parsing the service ID attribute. Moreover, SMCF parses the software module information and access control policy by parsing the authorization and access control information attribute.

Subsequently, in Step 4, SMCF sends a single response message combining the Service State Update Response and Service Description Parsing Response to SCF over reference point 'In' within Service Enabler Function (shown in FIG. 5). The Service State Update Response indicates the service state is already updated to the required state, e.g., 'Added', and Service Description Parsing Response includes the capabilities and features of the new service.

Next, SCF and service capabilities exchange a Service Capability Verification Request and Response over reference point 'a' (shown in FIG. 5) within a service layer according to Step 5. SCF reads the information from SMCF, and then initiates multiple communications with different Service Capability (SC). According to one embodiment, the communications may include a Service Layer Configuration. Here, the service node updates its configuration of functionalities that it provides when enabling a new service. This information can be extracted from a couple of attributes in the service description, such as service ID and protocol support.

According to another embodiment, the communication may include software management details. Here, the service layer may maintain the software module information, which supports the new service. This information comes from the software module information attribute in the service description, which contains one or more of a software module ID, size, version and user instruction.

In yet another embodiment, the communication may include Security details. The security details are based upon information derived from an authentication method and authorization and access control information. Here, SCF contacts the security SC to see if the required security-related method/algorithm is supported, e.g., whether the security algorithm on the sensitive data required by new service is supported, and authentication and authorization methods are enabled in the service layer. If any of these methods or algorithms are not yet enabled, the security SC will enable the required method and update the security profile to indicate that the required security method is already enabled.

In a further embodiment, the communication may include charging policies. The charging policy attribute contains most of the required information, such as a charging model, charging event and charging rate. Namely, SCF sends the charging information of the new service to the charging SC, so that the charging SC could record the information and know how to charge the service consumers when they use the new service.

In yet a further embodiment, the communication may include registration protocols. Namely, the newly enabled service may have potential impacts on other entities, e.g., applications and management entities that are registered with the service layer. For example, the application may be notified when upgrading from an old version to a new version to provide new features and fix some bugs in the previous version. In particular, the SCF determines what external entities it should notify after enabling the new service. The SCF will send a request message to registration SC with the necessary information including service ID attributes and service list attributes in the service description. The registration SC checks the list of entities that are registered with this service layer to find out the entities that are using any service impacted by the new service. Subsequently it returns the list of entities to notify.

In yet a further embodiment, the communication may include DM protocols. If the new service is defined by an application, the application provides the software module to the service layer. Then the service layer may push the software module down to the underlying DM protocol to install the software module. The Service Enabler Function determines if it is necessary to collaborate with DM SC to enable the new service. In an exemplary embodiment, this may be performed by parsing the service ID and software module information attributes in the service description to determine if the software module is from the application. If it is, the SCF will send the service ID and software module information as well as software module itself to DM SC for installation of the software module.

With respect to Step 6 of FIG. 8, the SCF sends a Service API Management Request to SAMF over reference point 'In' (shown in FIG. 5) within the Service Enabler Function. Namely, the SCF passes the service API to SAMF in the request. SAMF integrates the service API into the service layer so that the service may be recognized and utilized by applications and other service layers. In addition, SAMF may translate the service API so that the service API is compatible with other services hosted in the service layer. It may also add some new functionality supported by the service layer and not by the new service itself.

Next, in Step 7, the SAMF sends a Service API Management Response to SCF over reference point 'In' within the Service Enabler Function. The SAMF finishes the service API management for the new service, and then returns the service API link or method to SCF for the new service. In an exemplary embodiment describing an RoA-based service, the response includes a URI or a link to a list of resources to represent the new service. In another exemplary embodiment describing a SoA-based service, the response includes interface or common function to call a list of functions with parameters to describe the functions provided by the new service.

In Step 8, the SCF determines which entities need to be notified about the new service. Different criteria may be used to determine if an entity needs to be notified. These may include but are not limited to: (i) whether the entity is registered with this service layer; (ii) whether the entity is registered with this service layer and potentially use the new service; and (iii) whether the entity subscribes to receive the notification if a new service is added to the service layer. In this case, the subscription is specific to a service. In other words, an entity may be notified multiple times if the entity subscribes to the receive notifications for different services.

Subsequently the SCF sends Service Enabling Notification over reference point 'b' to other service layers in Step 9, and over reference point 'c' to applications (shown in FIG. 5). Notification may include the latest operation, e.g., add, activate, deactivate or remove a service, performed by Service Enabler Function. For instance, the notification indicates a new service is added, and the link/method to retrieve the new service information, so that applications and other service layers may recognize and utilize the new service.

According to another embodiment, as shown in FIG. 8, more information may be exchanged about the new service (Step 10). This occurs over reference point 'b' for other service layers, and reference point 'c' for applications (shown in FIG. 5). After getting the notification about new service, external entities, e.g., applications and other service layers, may have multiple rounds of communications with SCF to request more detailed information. For example, if an application determines to switch to the new version of a service, it may ask SCF for more specific information about security, charging, subscription, etc.

According to another embodiment, as shown in FIG. 8, a service enabling notification may be sent from the Service Enabler Function to NSE1 (Step 11). For example, in case that the new service is defined by the application, which provides the software module, it is necessary for Service Enabler Function to communicate with underlying NSE to provide the software module. It may provide the software module or a link to retrieve the software module, so that the underlying NSE could download and install the software module to enable the new service at underlying network.

In the event the process of adding a new service fails in a certain step, e.g., the installation of software module to support the new service fails, the SCF will report to the entity, which triggers the process of adding a new service. The report will include the reason for failure. The triggering entity will take further steps to determine whether to add the new service again. It is also envisaged according to the application that a service enabling request is requesting to add, activate, deactivate or remove multiple services or multiple versions of services at a time. The methods and procedures proposed in this application may be repeated for handling one service or a version of service upon the request at a time.

Figure 9:
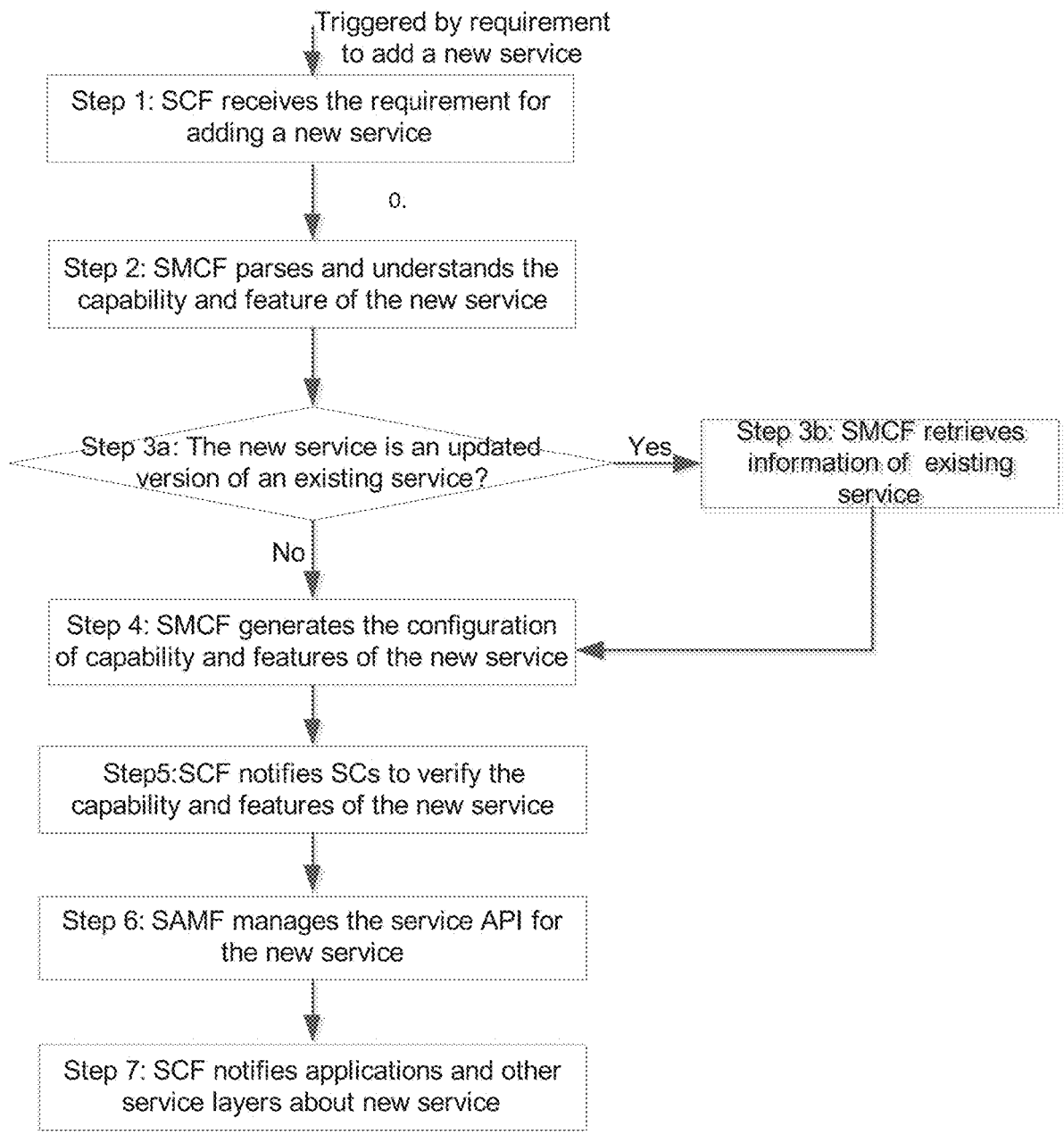
FIG. 9 illustrates an embodiment of a method for the Service Enabler Function to add a new service.

In an embodiment of the application, the Service Enabler Function is described as the main function that drives the process for adding a new service. FIG. 9 is an exemplary embodiment of a method for the Service Enabler Function to add a new service. Each of the steps in FIG. 9 are denoted by a numeral, e.g., 0, 1, 2, etc. First, there is a trigger to add a service (Step 0). Next, the SCF will be the first function triggered in the process of service enabling process (Step 1). SMCF parses the service description and understands what capabilities and features the new service provisions. SMCF gets the service description from SCF (Step 2). Next, it is determined whether the new service is a new version of an existing service (Step 3a). If it is, SMCF will retrieve the information of the existing versions, such as software module version, capability and features and charging information (Step 3b). If not, it will proceed to the next step. Specifically, to determine if the new service is a new version or not, SMCF may refer the service description attributes, such as service ID, software module information, service API. The information of the old version may be retrieved from the existing service API or some service repository. Next, by parsing the service description, SMCF generates the configuration of capabilities and features of the new service (Step 4). When the new service is a new version of an existing service, Service Enabler Function needs to indicate the main difference between new version and old version(s), or provides the method/link to retrieve the information of the old version(s). SMCF then sends the new service information to SCF. Subsequently, SCF communicates with several SCs in the service layer to check if the methods, algorithms or models required by the new service are enabled and supported in the service layer (Step 5). If some algorithms for the new service, e.g., security algorithm for sensitive data, are not supported in service layer at the present time, Service Enabler Function will update the configuration of capability of the service layer for integrating the new service into the service layer. Then, SAMF manages the service API for the new service (Step 6). After adding the new service to service layer, SCF informs the external applications and other service layers with the service API of the new service, so that new service may be recognized and utilized (Step 7). For example, for RoA-based service, the SCF may indicate the link to the resource of the new service. On the other hand, for SoA-based service, the SCF may specify the functions and parameters for using the new service.

Method to Manage Service API

Figure 10:
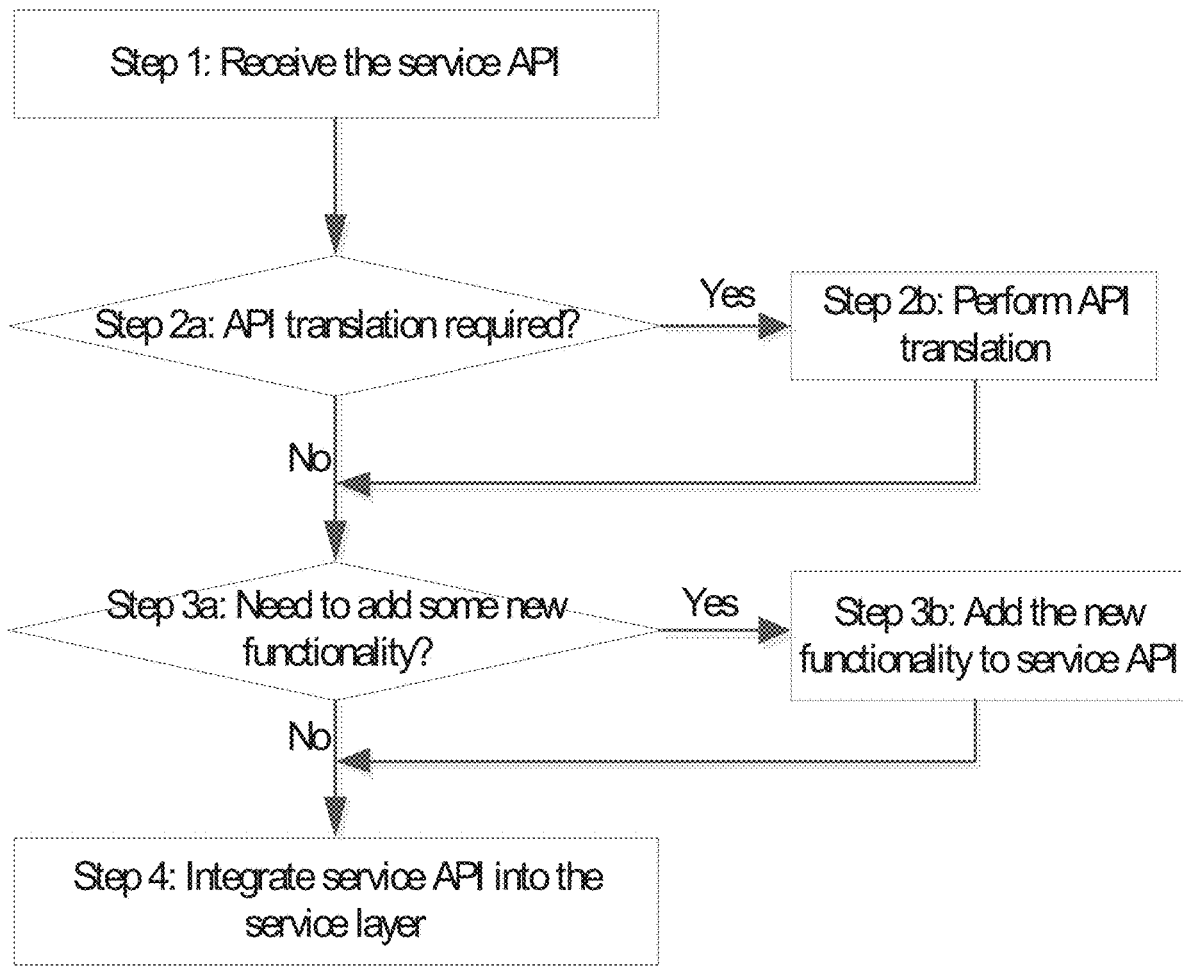
FIG. 10 illustrates an embodiment for managing the service API for each service when adding a new service into the service layer.

According to another embodiment of the application, a method is presented for managing the service API for each service when adding a new service into the service layer as illustrated in FIG. 10. The method is performed by the SAMF inside the Service Enabler Function as described above. Specifically, the SAMF receives the service API from the SCF, which is an attribute in the service description (Step 1). Next, it is determined if API translation is required (Step 2a). If so, SAMF performs the API translation based on the service API and the common APIs supported by service layer (Step 2b). If not, the SAMF proceeds to the next step. To determine if the translation is required, SAMF first determines if the service is RoA-based or SoA-based. Thereafter, the SAMF determines if it is compatible with other services hosted in the service layer. For example, if service is SoA-based, but the service layer only supports RoA-based resource, translation is needed. In one exemplary embodiment, if the service is RESTful service and service layer supports only non-RESTful services, translation may be required. Next, it is determined if some new functionality is required (Step 3a). If so, the SAMF adds some new functionality that is not supported by original service API (Step 3b). If not, SAMF proceeds to the next step. Namely, some functionality is not natively supported by the service, but is required by the service layer. In an example, access control information may not be specified by the service API, but it is required that all the services hosted in the service layer specify the access control information. If access control is not specified by the original service API, service layer will use the default access control rule for the new service. Further, the SAMF integrates the service API into the service layer, so that the new service could be recognized and utilized (Step 4). For RoA-based service, its resource may be linked to the resource tree of the service layer. On the other hand for SoA-based service, its functions may be called by the common functions of service layer.

Method for Removing a Service

According to another embodiment of the application, there is described a Service Enabler Function that is responsible for removing a service from the service layer. There may be several reasons to remove a service. For example, the service may not be compatible to a new system. Hence, a client may never utilize it. Moreover, the service does not follow some new mandatory policy. Further, the original service provider decides to remove the service. For the purposes of this application, it is assumed the decision of removing a service is already made. Accordingly, there is no need to check if removing a service is allowed by the service layer.

Figure 11:
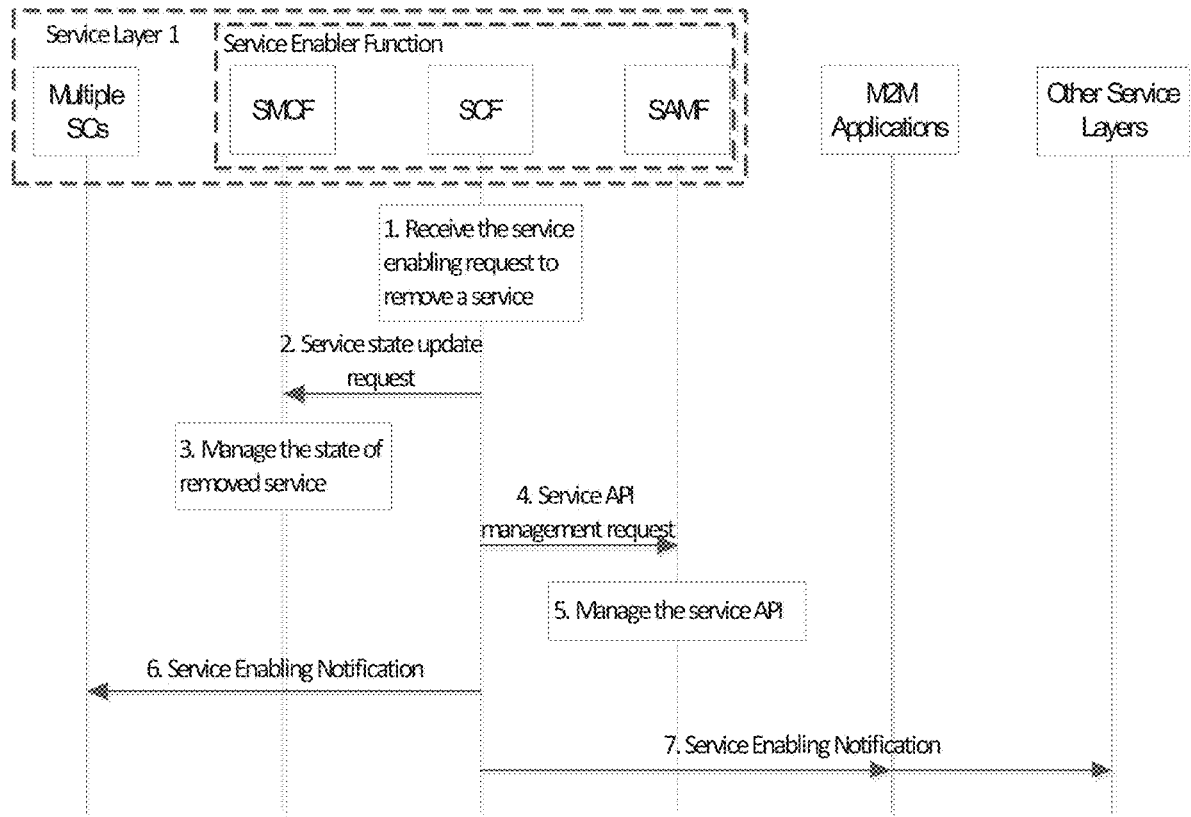
FIG. 11 illustrates an embodiment of a method for removing a service from the service layer.

According to an exemplary embodiment as shown in FIG. 11, a procedure to remove a service from the service layer is described. Each of the steps in FIG. 11 is denoted by a numeral, e.g., 0, 1, 2, etc. Specifically, the SCF receives a requirement to remove a service from some entities, e.g., service capabilities, application or service provider (Step 1). To accurately identify what service to be removed and which version(s) to be removed, one or more of the following attributes in the service description needs to be specified: (i) Service provider ID; (ii) Service ID; (iii) Software module information; and (iv) Service API. Next a service state update request is sent from the SCF to the SMCF in the Service Enabler Function (Step 2). This happens over reference point 'In' within Service Enabler Function as shown in FIG. 5. Once the request to remove a service has been received, SCF sends the information to SMCF for identifying what service and which version to remove. Next, the SMCF manages the configuration of the removed service based on the information from the SCF (Step 3). Specifically, if the service is to remove a version of a service, the SMCF will update the configuration of capabilities and features of the service by removing those capabilities and features provided by the version. If a service is removed completely, e.g., all versions are removed; the SMCF eliminates the configuration record of the service. In an exemplary embodiment, the service layer may maintain a record for a removed service with some basic information, such as service provider, version number and software module version. This may prove useful if the service is added with the latest version in the future. It is not necessary for the SMCF to confirm with the SCF after this step for confirmation, because it is assumed the decision is made to remove the service. The SMCF also does not need to give feedback to the SCF. That is, the SCF knows the operations and results of this step. In an exemplary embodiment, next, the SAMF receives the request from the SCF to remove or update the service API (Step 4). In the request, the SCF specifies the information of the to-be-removed service, such as service ID, service API link or functions. If removed service is a version, the SAMF will remove the corresponding contents in the service API for the specific version, and maintain other contents in the service API. Further, the SAMF follows the information in the request to remove and/or update the service API (Step 5). It is possible that the SAMF is required to remove and/or update several versions for one or more services. It is envisaged in this application that Steps 2 and 3 may occur in parallel with Steps 4 and 5, respectively, if the SCF contacts the SMCF and the SAMF at the same time.

Next, SCF initiates several communications with different SCs to inform that a service or version(s) of a service is removed (Step 6). This happens over reference point 'a' within service layer according to FIG. 5. Those SCs could update their configuration accordingly. Even further, the SCF informs applications and other service layers that the service is removed. The SCF needs to notify all the entities that are possibly impacted by removing the service (Step 7). This happens over reference point 'b' for other service layers, and reference point 'c' for applications according to FIG. 5.

Method for Deactivating a Service

In yet a further embodiment of the application, a method for deactivating a service is described. Generally, deactivating a service is relatively straight-forward when compared with adding or removing a service. Namely, deactivating does not require any change except the status update of the service in the service layer. For deactivating a service, the SMCF changes the status of the service to 'Inactive', and then notifies those external entities that may be impacted by deactivating operations.

Figure 12:
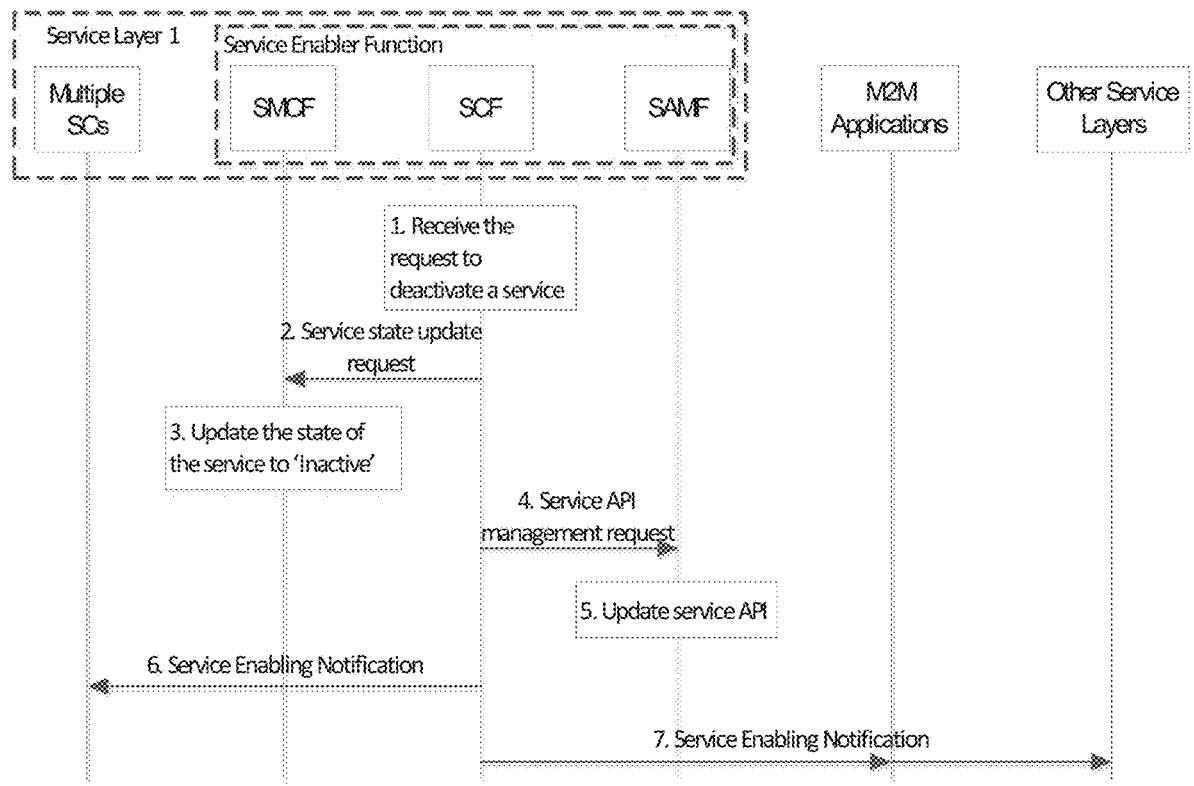
FIG. 12 illustrates an embodiment of a method for deactivating a service.

In an exemplary embodiment, FIG. 12 shows the procedure to deactivate a service. Each of the steps in FIG. 12 is denoted by a reference numeral, e.g., 0, 1, 2, etc. First, the SCF receives the requirement to deactivate a service (Step 1). The requirement may come from an internal service capability, an external application or other service layer.

There may be multiple events that trigger the service deactivation process. For example, a service is deactivated if the service is malfunction. A service may also be deactivated if the service breaks some policy and rules of the service layer, e.g., a location service breaks the privacy policy of service layer by revealing location of clients to other clients. A service may also be deactivated if the service is not used by a client and maintained only for backup purposes. In Step 2, the SCF sends a request to the SMCF to manage the state update for deactivating the service. This happens over reference point 'In' within Service Enabler Function as shown in FIG. 5.

Next, the SMCF updates the state of the service to 'Inactive' (Step 3). It may not be necessary for SMCF to confirm with the SCF after this step. The SCF knows the operations and results of this step. Next, a service API management request is sent from the SCF to the SAMF (Step 4). In turn, the SAMF updates the service API of the deactivated service, such as availability information (Step 5). The SCF initiates several communications with different SCs to inform that a service is deactivated (Step 6). This happens over reference point 'a' within service layer according to FIG. 5. In Step 7, SCF informs applications and other service layers that the service is deactivated, e.g., Service Enabling Notification. This happens over reference point 'b' for other service layers, and reference point 'c' for applications according to FIG. 5.

According to an embodiment, when deactivating a service, the triggering entity may specify the time duration of the deactivation. That is, after the specified time period, the service will be activated and ready for use. In this case, operation of activating a service may become simpler, because service consumers know when the service will become active. Moreover, when notifying the entities about the deactivation of a service, Service Enabler Function may recommend some similar services as alternatives, which are provided by the service layer. If deactivation is permanent, a method/link may be provided to retrieve the information of the service in the future.

Method for Activating a Service

According to even a further embodiment of the application, there is described a method for activating a service. Activating a service follows a similar procedure with that discussed above for deactivating a service. However, the state of the service is changed to 'Active'. In one embodiment, if the activation occurs along with adding the new service, e.g., adding a new service and activating the service immediately, the activation process may be integrated into the process of adding a new service. On the other hand, if the new service is activated in a separate process after adding the new service, Service Enabler Function changes the status of the new service to 'Active', and then notifies the entities e.g., service capacities, applications and service layers.

In an alternative embodiment, Activation of an existing service occurs from one that was deactivated. Here, the Service Enabler Function changes the status of the new service to 'Active', and then notifies the external entities, e.g., service capacities, applications and service layers.

Method for Handling Dependency Problem

In accordance with another embodiment of the application, issues may occur when dealing with dependency problems when adding, activating, deactivating or removing a service in a service layer. For example, consideration is drawn to a gas station searching service relying on a location service. If the location service is temporarily deactivated or permanently removed, the application may not be able to provide information of nearby gas stations. In another example, consideration is drawn to a service that automatically controls the temperature of a room with a pre-set temperature. The service relies on a set of sensors automatically reporting the current temperature in the room. If the sensors stop sensing and reporting temperature, there is a problem for the service that controls the temperature.

Even adding or activating a service may cause issues. For example, if the sensors in the temperature-controlled service provide a new service for reporting the humidity, in addition to temperature, the service that controls the temperature needs to determine whether to stick to the old service or switch to the new service. According to the application, the set of services that the service depends upon may be determined.

Figure 13:
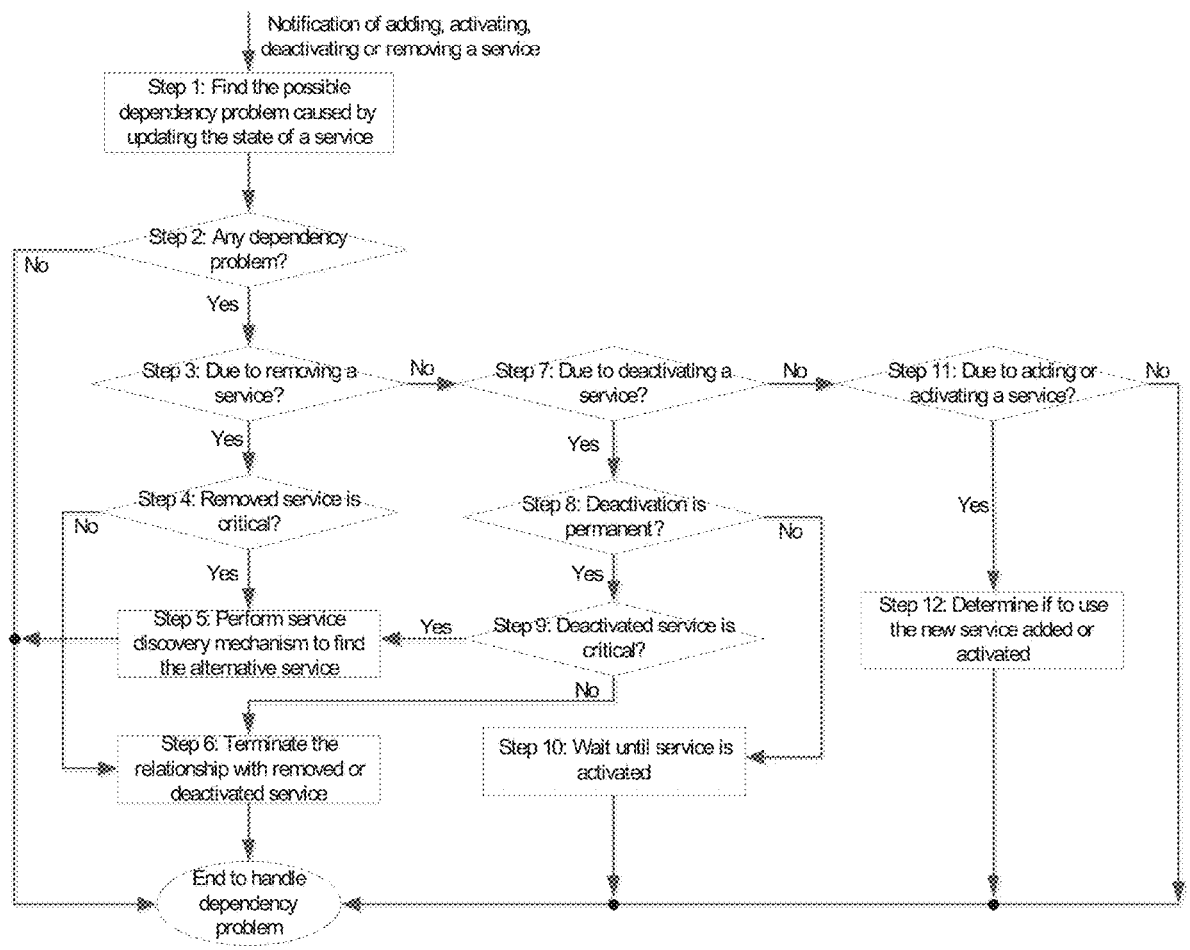
FIG. 13 illustrates an embodiment of a method for dealing with a dependency problem when adding, activating, deactivating or removing a service in the service layer.

FIG. 13 illustrates an exemplary embodiment of a method to deal with a dependency problem when adding, activating, deactivating or removing a service in the service layer. Each of the steps is denoted in the figure as Step '#'. Once a notification is received that a service is added, activated, deactivated or removed, the Service Enabler Function starts to find whether any other service is impacted (Step 1). To find the dependency problem, the Service Enabler Function as shown in FIG. 5 may extract information from the notification. In one embodiment, the notification contains the triggering event, e.g., add, activate, deactivate or remove, and some attributes from the service description, such as for example, service ID and service list. In Step 2, it is determined whether there is a dependency problem. Namely, the Service Enabler Function will determine the further action based on the triggering event, e.g., add, activate, deactivate or remove a service. Assuming there is a dependency problem, the Service Enabler Function checks whether it is due to removing a service. The methodology when the dependency problem is not due to the service will be discussed below in further detail.

According to Step 4, it is determined whether the removed service is critical. 'Critical service' means a service that other service can provisionally be relied upon, otherwise some services cannot be provisioned. For example, billing service is a critical service. It is understood according to this section of the application that the decision of 'removing a service' is already made. Next the Service Enabler Function performs the service discovery mechanism to find the alternative service if the removed service is determined to be critical (Step 5). It is generally understood in this application that any service discovery mechanism may be applied. Further, the relationship between impacted service and removed/deactivated service is terminated if the removed/deactivated service is determined not to be non-critical (Step 6). Non-critical means the impacted service may be utilized without the removed/deactivated service.

The methodology when the dependency problem is not due to the service (a negative reply to Step 3) will now be discussed. Namely, it is checked whether the dependency problem is due to deactivating a service (Step 7). If the dependency problem is due to deactivating a service, it is determined whether the deactivation is permanent (Step 8). If the deactivation is permanent, the Service Enabler Function checks whether the deactivated service is critical (Step 9). If the deactivation is not permanent, the Service Enabler Function waits until the service is activated (Step 10). During the waiting time, if deactivated service is critical, the impacted services may be paused, otherwise the impacted services may be provisioned without the deactivated service According to another embodiment, the Service Enabler Function checks whether the dependency problem is due to adding or activating a service (Step 11). If it is, it is determined whether to use the service that was newly added or activated.

OneM2M Service Layer Embodiment

Figure 14:
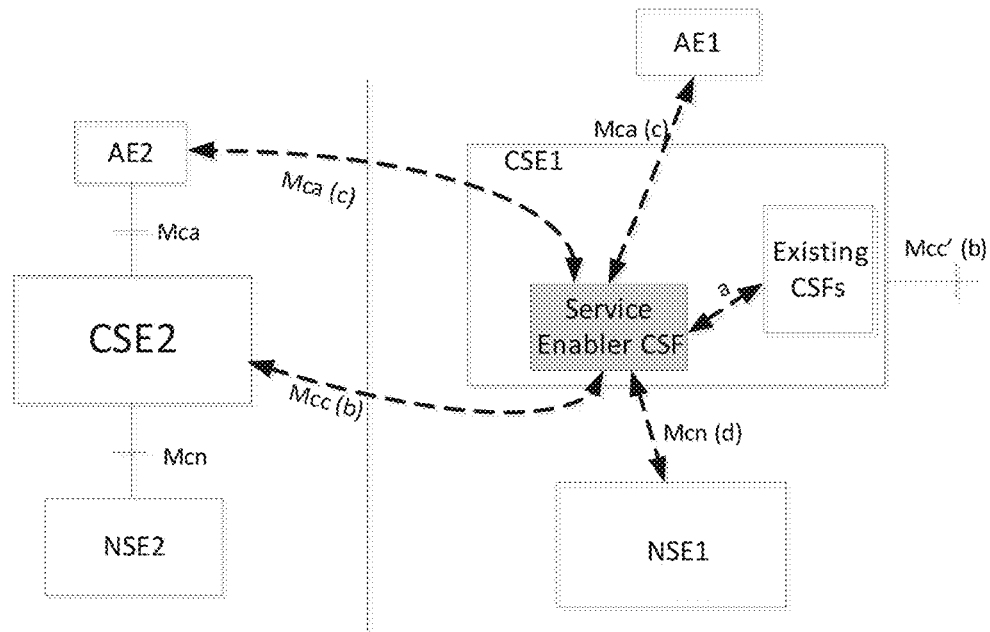
FIG. 14 illustrates an embodiment of an oneM2M functional architecture to support the Service Enabler Function.

According to another aspect of the application, oneM2M RESTful functional architecture is described. For example, FIG. 14 illustrates an exemplary embodiment for enhancing the existing oneM2M functional architecture to support the Service Enabler Function. As shown the Service Enabler Function may be a new CSF in the CSE. The CSF coordinates adding, activating, deactivating or removing a service within the CSE. The CSF also communicates with AEs, other CSFs and CSEs, respectively. Moreover, the embodiment shown in FIG. 14 provides reference point mapping between oneM2M and the generic architecture illustrated in FIG. 5.

Figure 15:
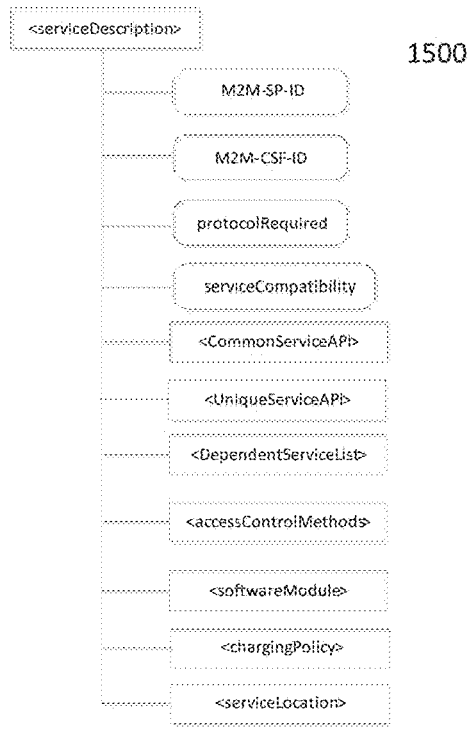
FIG. 15 illustrates an embodiment of the structure of a service Description resource in accordance with FIG. 14.

The initiator of the new service, for example AE2 or a CSE1 shown in FIG. 14, sends the service description to the Service Enabler CSF located within CSE1. The initiator includes the information needed to define the new service, in the format of RESTful resources. A resource representation is included in the Service Enabling Request message. In particular, FIG. 15 shows the structure of the <serviceDescription>1500 resource. The <serviceDescription>1500 resource corresponds to the generic service description discussed above. Each of 'M2M-SP-ID', 'M2M-CSF-ID', 'protocolRequired', and 'serviceCompatabilty' are attributes. Moreover, each of <CommonServiceAP>, <UniqueServiceAPI>, <DependentServiceList>, <accessControlMethods>, <softwareModule>, <chargingPolicy> and < >serviceLocation> are sub-resources. A sub-resource can be further defined by attributes.

Figure 16:
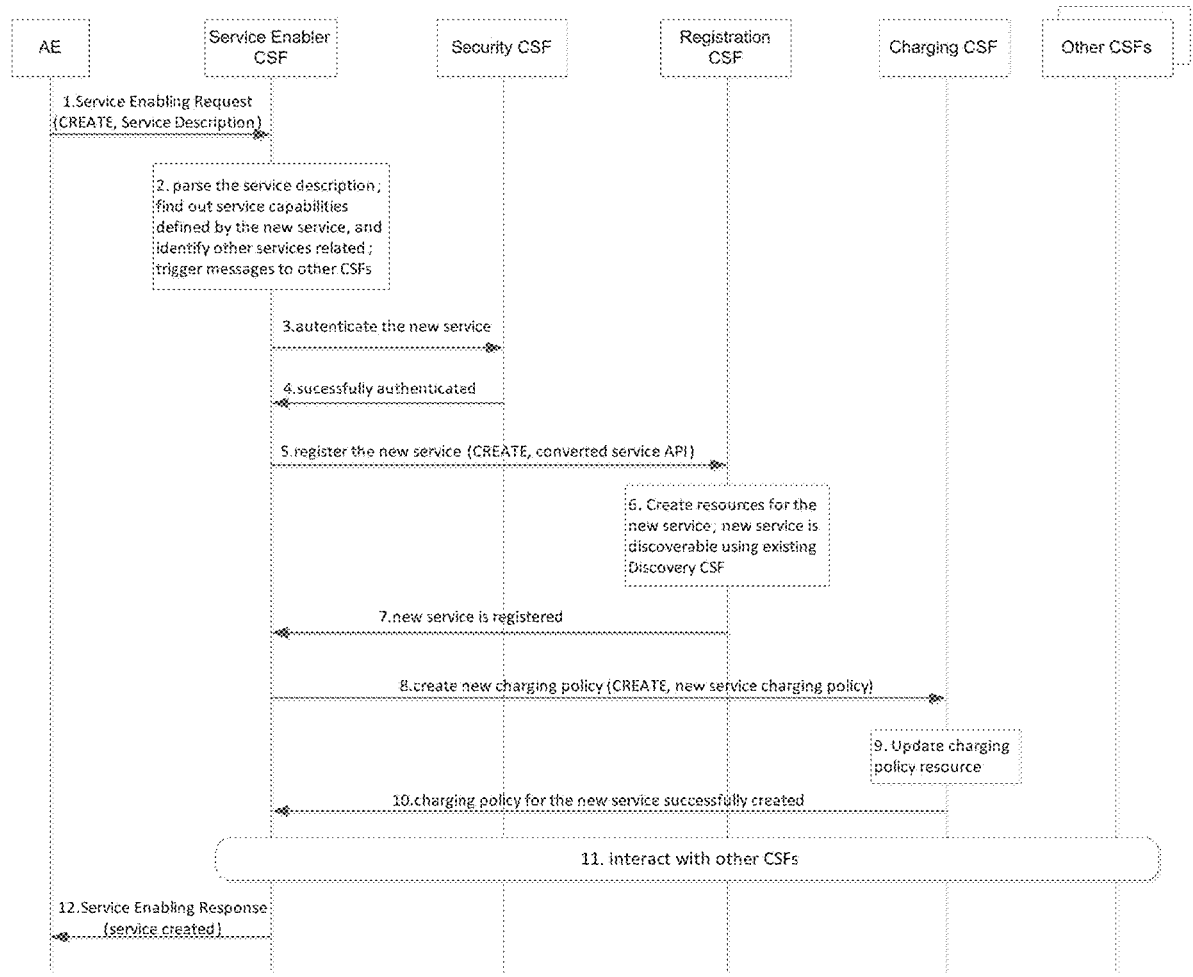
FIG. 16 illustrates an embodiment of a method for adding a new service employing the proposed Service Enabler CSF to the oneM2M service layer illustrated in FIG. 14.

In an embodiment as shown in FIG. 16, the technique of adding a new service employing the proposed Service Enabler CSF to the oneM2M service layer illustrated in FIG. 14 is described. As depicted, the new service is initiated by AE. Each of the steps in FIG. 16 is denoted by a numeral, e.g., 1, 2, etc. First, the AE sends the Service Enabling Request to the Service Enabler CSF (Step 1). A CREATE request may be used for this message. The CREATE request contains the <serviceDescription> resource representation for the new service.

Upon receiving the request, the Service Enabler CSF operates in accordance with the description provided earlier in this application. Mainly the Service Enabler CSF will parse the service description (Step 2). Based upon the information defined in the service description, it will be able to find out key information regarding the new service, such as the service capabilities provided by the new service, other services related to this new service. The Service Enabler CSF will initiate a series of operations involving other CSFs to enable the new service, as described in following steps. Interactions with other CSFs are via inter-CSF reference points.

Based on the access control methods provided (such as authentication method, authorization and access control information), the Service Enabler CSF may contact the Security CSF to authenticate the new service (Step 3). The Security CSF may approve authentication (Step 4). Next, the Service Enabler CSF triggers the registration process for the new service (Step 5). Next, resources for the new service may be created as discussed in this application, and is discoverable using existing Discovery CSF (Step 6). It may re-use the existing registration process (Step 7).

The Service Enabler CSF initiates interactions with other CSFs based on the "related service list" information provided in the Service Description. For example, it can interact with the charging CSF to add new charging policy provided by the new service (Step 8). The charging policy resource is updated by the Charging CSF (Step 9). Moreover, the charging policy for the new service is successfully created and relayed back to the Service Enabler CSF (Step 10). According to Step 11, there is interaction with other CSFs. Lastly, upon successful completion of interactions with other CSFs, e.g., DMG CSF, Application and Service Layer Management CSF, the Service Enabler CSF returns a Service Enabling Response message to indicate that the new service has been added and integrated successfully at the service layer (Step 12).

Figure 17:
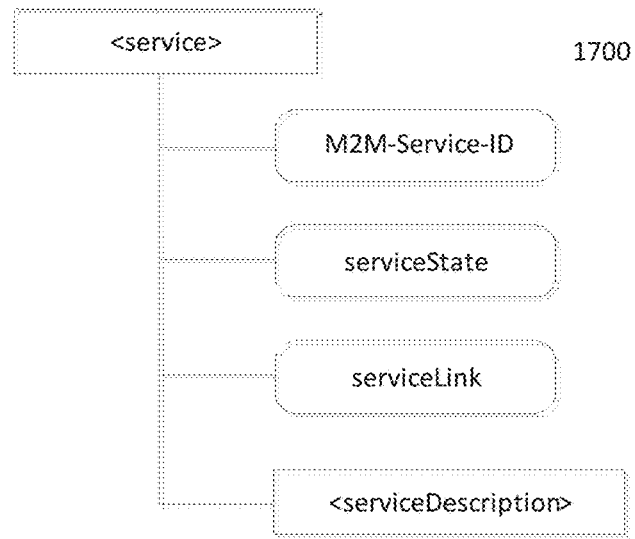
FIG. 17 illustrates an embodiment of a new service resource in accordance with the application.

According to another embodiment, FIG. 17 illustrates the proposed new <service>1700 resource, which corresponds to the common service API described in this application. For illustrative purposes, only the attributes are provided. oneM2M defined common attributes are not shown. When a new service is being created, a new instance of the <service> resource is generated at the service layer. The serviceState indicates the state information as discussed above in this application. Note that a "removed" service may still have an instance at the service layer for purposes like tracking and statistics. The serviceLink points to the resources or data structures specific to a new service. Such data structure can be uploaded as a software module, as mentioned in previous call flows. When a new instance of the <service> resource is created, the <serviceDescription> provided by the originator that wants to create the new service is stored with the instance.

Figure 18:
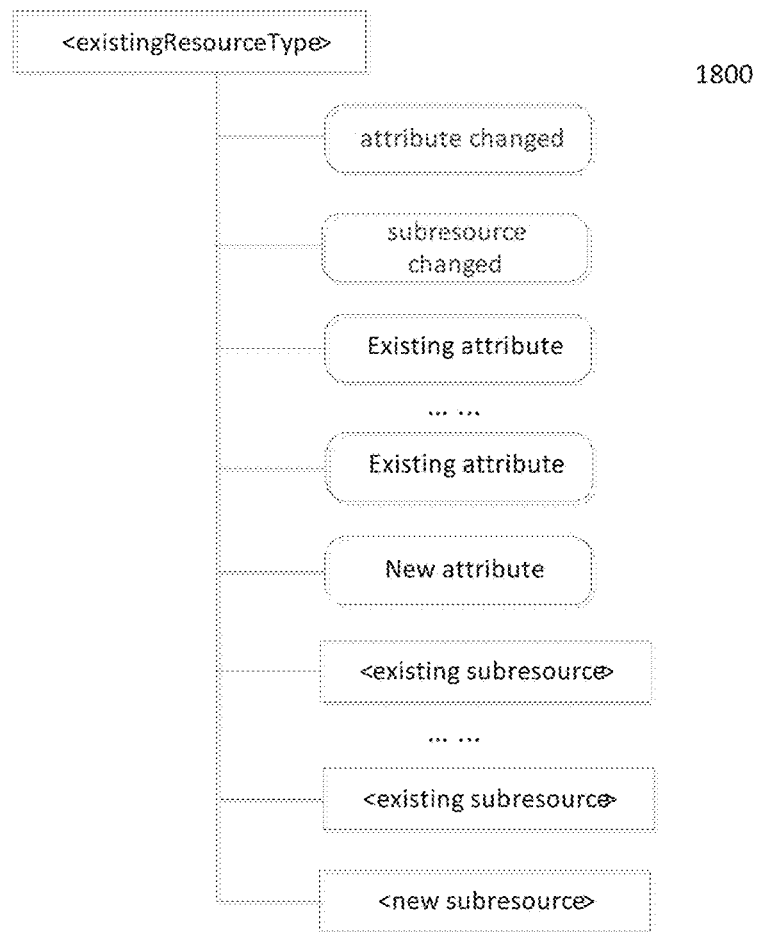
FIG. 18 illustrates an embodiment of an extensible resource structure in accordance with the application.

In yet another embodiment, FIG. 18 illustrates a generic template for an extensible resource structure. The template may apply to any existing and future resources for the oneM2M service layer. Here, the type is <existingResource-Type>1800. Two indicators are added to the resource structure as common attributes. One indicator indicates whether or not the attributes have been changed. The other indicator indicates whether the sub-resources have been changed. By defaults, these indicators are set to "no". When there are new attributes or sub-resources created due to the addition of a new resource, the indicators are changed to "yes" when the Service Enabler CSF interacts with existing CSFs. Other CSFs, CSEs and AEs may subscribe to these indicators to get notifications of changes to any existing resources they are interested in. Once such indicators are changed to "yes", a new resource discovery procedure should be performed (existing resource discovery supported by oneM2M service layer can be used) so changes to attributes and sub-resources can be discovered.

OneM2M Service Component (SoA) Architecture Embodiment

Figure 19:
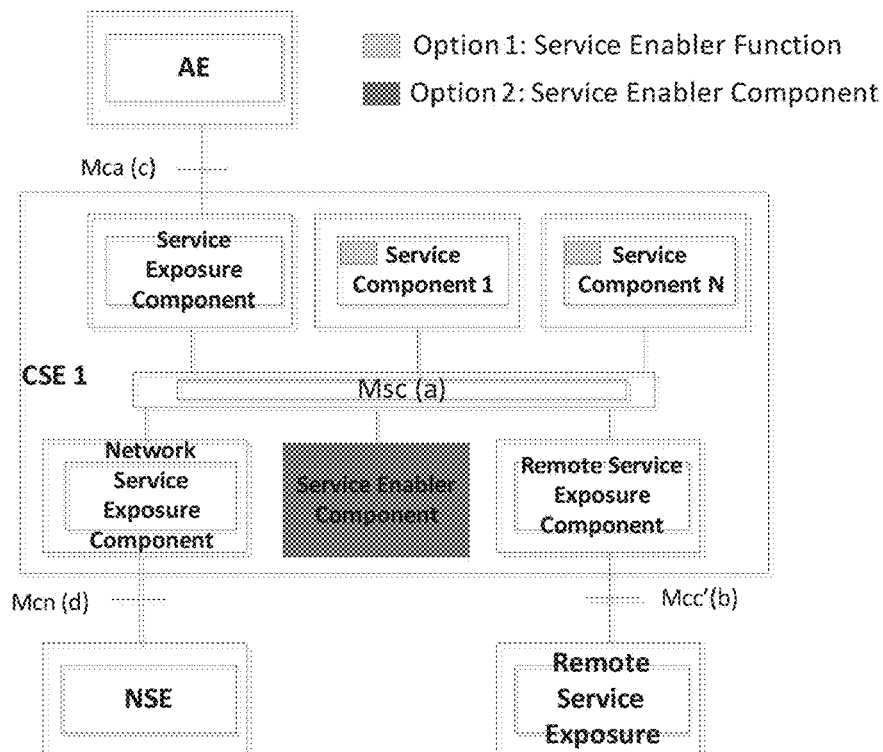
FIG. 19 illustrates an embodiment of architecture of the Service Enabler Function in the one M2M service component.

According to another embodiment of the application, as illustrated in FIG. 19, two potential implementation architectures of the Service Enabler Function in the oneM2M service component architecture are described. In one embodiment, the Service Enabler Function stays in each service component as a function therein, e.g., Service Component 1 and Service Component N. This may be due to the service component being the entity providing one or more services and is thus loosely coupled with other service components. In this way, each service component may independently perform the process of adding, activating, deactivating and removing a service within the service component. In an alternative embodiment, the Service Enabler Function is implemented by inserting an individual service component called 'Service Enabler Component'. If any service component wants to add, activate, deactivate and remove a service, it needs to collaborate with Service Enabler Component over a 'Msc' reference point.

Figure 20:
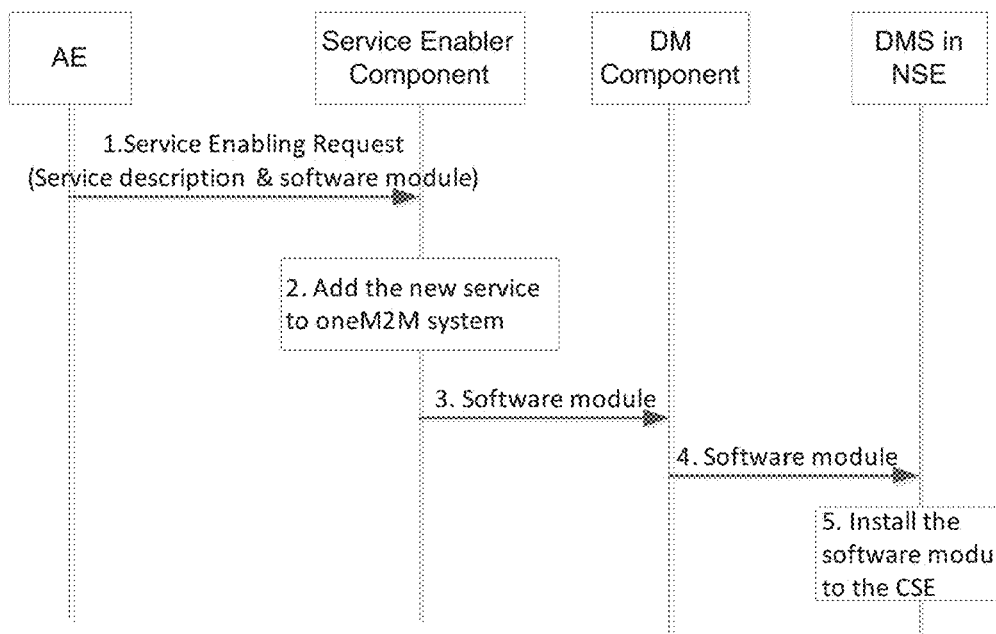
FIG. 20 illustrates an embodiment of a method for exchanging information by adding a new service.

According to even another embodiment, a method for exchanging information by adding a new service when an AE provides the new service is shown in FIG. 20. Each of the steps is denoted by a numeral, e.g., 1, 2, etc. Initially, the AE sends the new service to the Service Enabler Component at the CSE (service layer) (Step 1). The "new service" includes the service description and the software module. Next, the Service Enabler Component adds the new service to the oneM2M system, where service capability corresponds to Service Component, M2M application corresponds to AE, and service layer corresponds to CSE (Step 2). This step is the service enabling process occurring at the service layer. The service description contains all the information about the new service, so that the Service Enabler Component can parse the service description even if Service Enabler Component never knows the service before. After adding the new service, the Service Enabler Component passes the software module to the DMG Component (Step 3). Further, the DM Component forwards the software module for the new service to the associated DMS in the underlying NSE (Step 4). Lastly, the DMS in the underlying NSE installs the software module for the new service to the oneM2M CSE in the DM client, so that the new service is enabled (Step 5). According to this step, DMS completes the software enabling process as defined in the DM protocol, but DMS is not aware of the service layer information, including for example, service ID, capability and feature of the service, and service resource.

Figure 21:
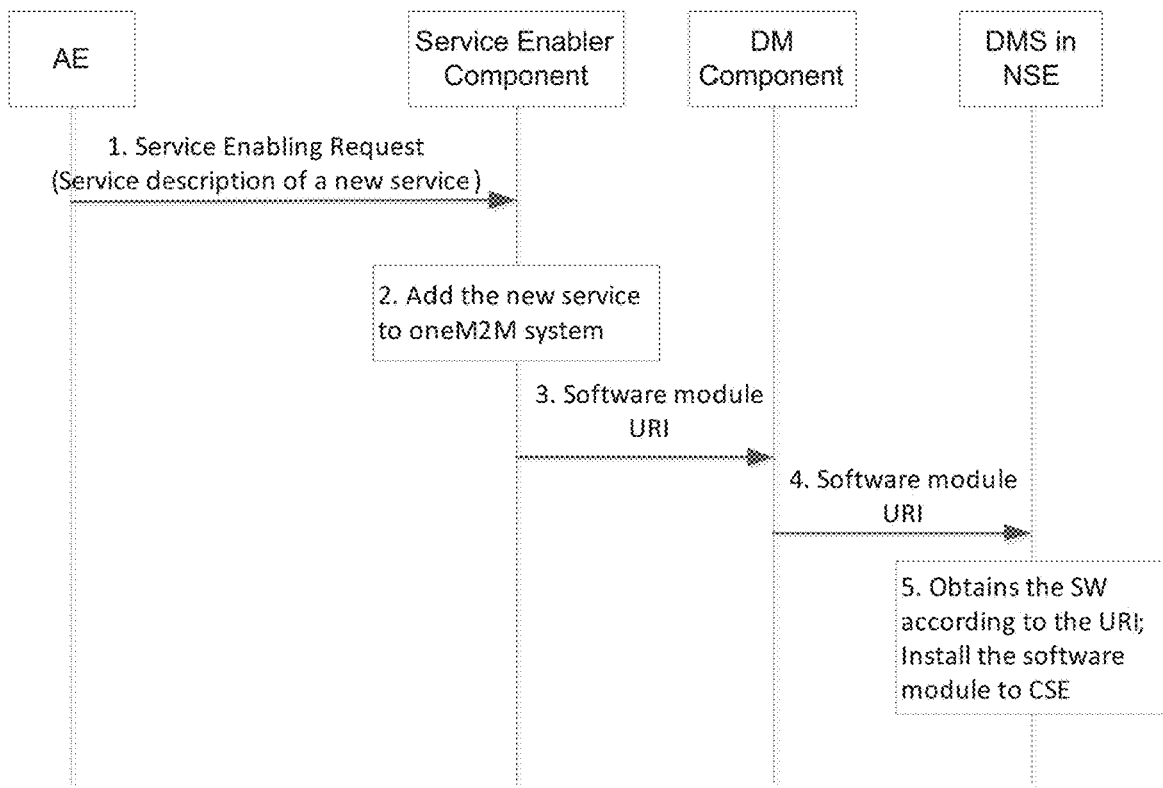
FIG. 21 illustrates an embodiment of another method for adding a new service according to the application.

In an alternative embodiment, FIG. 21 illustrates a different technique for adding a new service initiated by the AE. Each of the steps in FIG. 21 is denoted by a numeral, e.g., 1, 2, etc. A service enabling request is sent to the Service Enabler Component (Step 1). Then, the new service is added to a oneM2M system (Step 2). In contrast with FIG. 20, the AE only provides a link/URI to access the software module during the process of adding a new service (Step 3). The DMS in the underlying network obtains the software module with the link ((Step 4), and installs the software module to support the new service (Step 5).

Figure 22:
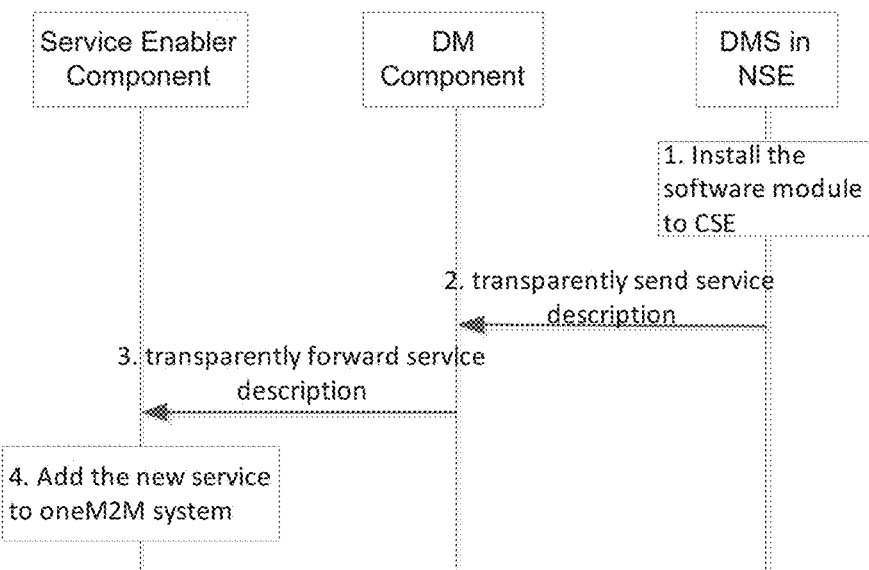
FIG. 22 illustrates an embodiment of a method of adding a new service when the service provider defines the new service.

According to a further embodiment, an information exchange regarding to adding a new service when the service provider defines the new service is shown in FIG. 22. Each of the steps in FIG. 22 is denoted by a reference numeral, e.g., 1, 2, etc. In this case, the DMS in the underlying NSE installs the software module first (Step 1). This is because the service provider defines the new service, and contacts the DM protocol first. However the DM protocol is transparent to the service layer information, e.g., DM protocol cannot read the service description and understand what the new service is. Next, the DMS transparently sends the service description to DM Component in CSE (Step 2). This is because the DMS is not concerned with the service description, and is triggered by the service provider to send to the service layer. Subsequently, the DM Component transparently forwards the service description of the new service to Service Enabler Component (Step 3). Further, the Service Enabler Component adds the new service into the oneM2M system (Step 4).

DM Based on oneM2M Functional Architecture

Figure 23:
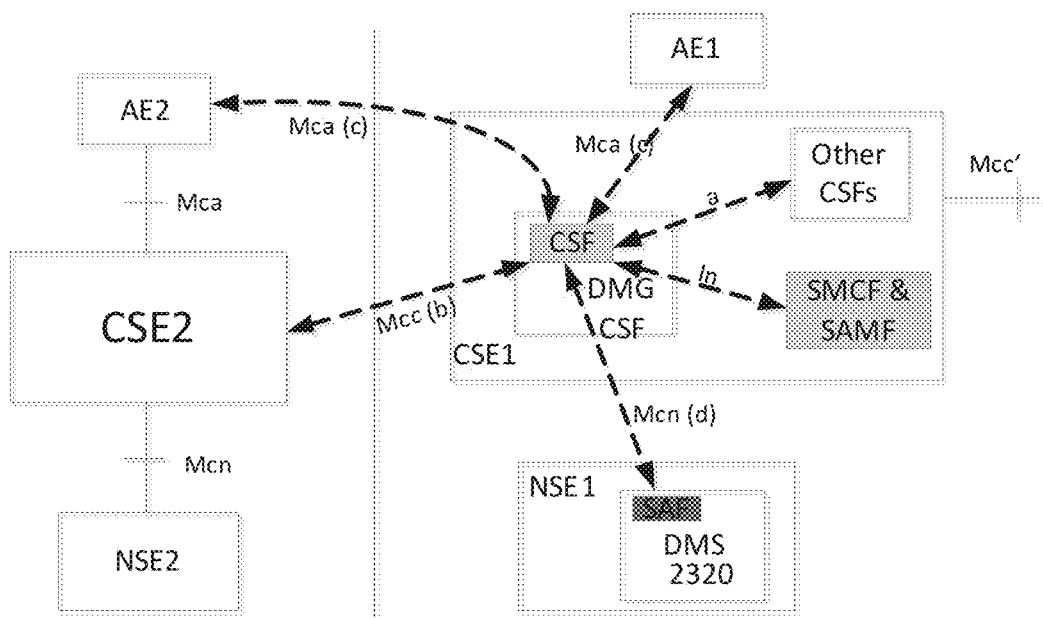
FIG. 23 illustrates an embodiment of architecture with a Service Enabler Function working over DM protocol.

According to yet even a further embodiment, FIG. 23 shows architecture 2300 of the Service Enabler Function working over DM protocol and oneM2M system. Specifically, three functionalities of the Service Enabler Function are implemented in different entities in a CSE. For instance, the CSF 2305 stays inside the DMG CSF 2310. In this sense, DMG CSF is responsible for driving and coordinating the procedure of adding, activating, deactivating or removing a service. Moreover, SMCF and SAMF are functions implemented as part of enabler functions. If the three sub-functions of the Service Enabler Function are implemented in different physical locations, the reference point 'In' will be used for message exchange among these sub-functions.

In addition, a Service Aware Function (SAF) 2315 is inserted in DMS 2320 of the underlying DM protocol. Since the current DM protocol is not service aware, e.g., DM protocol does not know anything about service from the service layer perspective, SAF requires a new indication field in the DM message to indicate whether it is necessary to trigger the Service Enabler Function at the service layer. When updating or installing a software module, SAF will check the new indication field, which will be setup by the entity providing the software module.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 8-13, 16 and 20-22. The computer executable instructions may be stored in a memory and executed by a processor disclosed above in FIGS. 1C and 1D, and employed in devices including servers, gateways and OneM2M devices. In one embodiment, a computer-implemented UE having a non-transitory memory and processor operably coupled thereto, as described above in FIGS. 1C and 1D, is disclosed. Specifically, the non-transitory memory has instructions stored thereon for updating, e.g., adding, a service in a network. The processor is configured to perform the instructions of: (i) receiving a request at a service enabler function located in a service layer to add the service; (ii) reviewing a service description of the requested service to understand its capabilities; (iii) sending a verification request to a service capability located in the service layer; and (iv) notifying an application or another service layer that the requested service is enabled.

In another embodiment, the non-transitory memory has instructions stored thereon for updating, e.g., removing, a service from a network. The processor is configured to perform the instructions of (i) receiving a request at a service enabler function located in the service layer to remove the service; (ii) identifying the service to be removed; (iii) sending a service state update request to a service state management and configuration function; and (iv) notifying an application or another service layer that the requested service has been removed.

While the methods, systems and software applications have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A computer-implemented method for managing a service in a service layer comprising:
   receiving a request at a service enabler function located in the service layer to manage a change of state of the service through a service API, where the service API includes a common service API and a unique service API, the common service API retrieves service information, the unique service API distinguishes the service from one or more other services, the unique service API accesses and/or utilizes the service or the one or more other services, and the change of state includes one or more of adding, removing, activating, and deactivating the service;
   reviewing and parsing, at the service enabler function, a service description indicating one or more service capabilities to recognize and utilize the requested service;
   based on the service description, identifying the one or more service capabilities in the service layer, and sending a request to and/or instructing the one or more service capabilities to ensure the requested service is enabled and supported by the service layer for the change of state;
   notifying one or more applications and/or other service layers that the service has changed its state.

2. The method according to claim 1, further comprising.
   integrating the service API into the service layer so the requested service can be discovered and utilized by the one or more other service layer and/or application, wherein the service API is RESTful.

3. The method according to claim 1, wherein the service enabler function translates the service API to be compatible with other services hosted in the service layer.

4. The method according to claim 1, wherein the service description is selected from service provider ID, service ID, list of dependent services, unique RESTful service API, common RESTful service API, location of the service, authentication method, authorization and access control information, software module information, protocol support, service compatibility, charging policy and combinations thereof.

5. The method according to claim 1, further comprising:
   determining, at the service enabler function, whether the service is an updated version of an existing service or a new service.

6. The method according to claim 5, wherein the determining step is performed by a service state management and configuration function.

7. The method according to claim 1, further comprising:
   receiving a response from the one or more of the service capabilities that a new service is enabled.

8. The method according to claim 1, further comprising:
    determining, at the service enabler function, which of the other service layer or the application to notify about the requested service.

9. The method according to claim 8, wherein the determining step is performed by a service coordination function.

10. A computer-implemented method for managing removal of a service in a Service layer comprising:
    receiving a request at a service enabler function located in the service layer to manage removal of the service through a service API, where the service API includes a common service API and a unique service API, the common service API retrieves service information, the unique service API distinguishes the service from one or more other services, the unique service API accesses and/or utilizes the service or the one or more other services, where the service includes a service description indicating one or more service capabilities to recognize and utilize the service;
    identifying and parsing, at the service enabler function, the service to be removed;
    sending a service state update request to a service state management and configuration function;
    notifying the one or more service capabilities in the service layer that the service has been removed; and
    notifying one or more applications and/or other service layers that the service has been removed.

11. The method according to claim 10, wherein the request includes a service description attribute selected from a service provider ID, service ID, software module information, RESTful service API, and combinations thereof.

12. The method according to claim 10, further comprising:
    determining whether a version of the service or the entire service is to be removed.

13. The method according to claim 10, further comprising:
    sending a request to a service API management function for removing the service API of the service.

14. A computer-implemented apparatus on a network comprising:
    a computer readable storage medium including instructions for managing a service in a service layer through a service API that, where the service API includes a common service API and a unique service API, the common service API retrieves service information, the unique service API distinguishes the service from one or more other services, the unique service API accesses and/or utilizes the service or the one or more other services, when executed by a processor causes the processor to:
    manage, via a service enabler function, a change of state of the service including adding, removing, activating, and deactivating the service;
    evaluate a service description indicating one or more service capabilities to recognize and utilize the service; and
    based on the service description, identify one of the service capabilities in the service layer, and send a request to and/or instruct the one or more service capabilities to ensure the service is enabled and supported by the service layer for the change of state.

15. The apparatus according to claim 14, wherein the service enabler function includes a service coordination function, service state management and configuration function and service API management function that communicate with each other.

16. The apparatus according to claim 15, wherein the service state management and configuration function describes the capabilities of the service for discovery and utilization by the an application or other service.

17. The apparatus according to claim 14, wherein the apparatus is a network node.

18. A networked system comprising:
    the apparatus according to claim 14; and
    an application domain.

* * * * *